US011330803B2

(12) United States Patent
Ehrman et al.

(10) Patent No.: US 11,330,803 B2
(45) Date of Patent: May 17, 2022

(54) CORRECTIVE COLLAR UTILIZING GEOLOCATION TECHNOLOGY

(71) Applicant: Protect Animals with Satellites, LLC, Upper Saddle River, NJ (US)

(72) Inventors: Kenneth Scott Ehrman, Upper Saddle River, NJ (US); Michael Ehrman, Plano, TX (US)

(73) Assignee: Protect Animals with Satellites, LLC, Upper Saddle River, NJ (US)

( * ) Notice: Subject to any disclaimer, the term of this patent is extended or adjusted under 35 U.S.C. 154(b) by 413 days.

(21) Appl. No.: 16/352,024

(22) Filed: Mar. 13, 2019

(65) Prior Publication Data

US 2019/0281794 A1 Sep. 19, 2019

Related U.S. Application Data

(60) Provisional application No. 62/779,243, filed on Dec. 13, 2018, provisional application No. 62/642,911, filed on Mar. 14, 2018.

(51) Int. Cl.
*A01K 29/00* (2006.01)
*A01K 15/02* (2006.01)
(Continued)

(52) U.S. Cl.
CPC ............ *A01K 29/005* (2013.01); *A01K 15/02* (2013.01); *A01K 27/001* (2013.01); *A01K 27/009* (2013.01); *H04W 4/021* (2013.01)

(58) Field of Classification Search
CPC .... A01K 27/001; A01K 27/00; A01K 29/005; A01K 15/02; A01K 27/009
(Continued)

(56) References Cited

U.S. PATENT DOCUMENTS 5,067,441 A 11/1991 Weinstein
5,815,077 A 9/1998 Christiansen
(Continued)

FOREIGN PATENT DOCUMENTS

CA 2865966 C 7/2021
CN 101713822 B 8/2013
(Continued)

OTHER PUBLICATIONS

Taiwan Office Action dated Nov. 13, 2020 issued in Taiwan Application No. 108108672.
(Continued)

*Primary Examiner* — Richard T Price, Jr.
(74) *Attorney, Agent, or Firm* — Troutman Pepper Hamilton Sanders LLP; James E. Schutz; Micah B. Hensley

(57) ABSTRACT

The disclosed technology includes a pet collar that can be configured to determine its geolocational position and evaluate that position with respect to the geo-fence of a predetermined, geo-fenced "safe" zone. If the collar determines that its position is inside a safe zone but is near the geo-fence, the collar may be configured to provide a warning correction. If the collar determines that it is outside a predetermined safe zone, the collar can also be configured to provide a stronger correction to discourage the pet from continuing away from the safe zone. The collar may also be configured to guide the pet back to the safe zone such as by varying the strength and/or type of correction provided based at least in part on the distance of the collar from the geo-fence.

19 Claims, 4 Drawing Sheets

(51) Int. Cl.
*A01K 27/00* (2006.01)
*H04W 4/021* (2018.01)

(58) Field of Classification Search
USPC ........................................................ 119/720
See application file for complete search history.

(56) References Cited

U.S. PATENT DOCUMENTS

| | | | |
|---|---|---|---|
| 5,868,100 | A | 2/1999 | Marsh |
| 6,043,748 | A | 3/2000 | Touchton et al. |
| 6,232,880 | B1 | 5/2001 | Anderson et al. |
| 6,232,916 | B1 | 5/2001 | Grillo et al. |
| 6,271,757 | B1 | 8/2001 | Touchton et al. |
| 6,487,992 | B1 | 12/2002 | Hollis |
| 6,581,546 | B1 | 6/2003 | Dalland et al. |
| 6,683,564 | B1 | 1/2004 | McBurney |
| 6,700,492 | B2 | 3/2004 | Touchton et al. |
| 6,903,682 | B1 | 6/2005 | Maddox |
| 7,110,777 | B2 | 9/2006 | Duncan |
| 7,259,718 | B2 | 8/2007 | Patterson et al. |
| 7,667,642 | B1 | 2/2010 | Frericks et al. |
| 7,861,676 | B2 | 1/2011 | Kates |
| 8,018,334 | B1 | 9/2011 | DiMartino et al. |
| 8,152,745 | B2 | 4/2012 | Smith et al. |
| 8,239,133 | B2 | 8/2012 | Wang et al. |
| 8,448,607 | B2 | 5/2013 | Giunta |
| 8,704,728 | B2 | 4/2014 | Mujahed et al. |
| 8,779,925 | B2 | 7/2014 | Rich et al. |
| 8,839,744 | B1 | 9/2014 | Bianchi et al. |
| 8,934,923 | B1 | 1/2015 | Golden |
| 8,935,093 | B2 | 1/2015 | Chansarkar |
| 8,939,111 | B2 | 1/2015 | Berntsen |
| 8,955,462 | B1 | 2/2015 | Golden |
| 8,972,180 | B1 | 3/2015 | Zhao et al. |
| 9,146,105 | B2 | 9/2015 | Golden |
| 9,146,113 | B1 | 9/2015 | Funk et al. |
| 9,173,380 | B2 | 11/2015 | Trenkle et al. |
| 9,258,982 | B1 | 2/2016 | Golden |
| 9,261,599 | B1 | 2/2016 | Golden et al. |
| 9,538,329 | B1 | 1/2017 | Vivathana |
| 9,648,849 | B1 | 5/2017 | Vivathana |
| 9,654,925 | B1 | 5/2017 | Solinsky et al. |
| 9,848,295 | B1 | 12/2017 | Mason et al. |
| 9,922,522 | B2 | 3/2018 | Solinsky et al. |
| 9,924,314 | B2 | 3/2018 | Solinsky et al. |
| 10,109,174 | B2 * | 10/2018 | Troxler .............. G08B 21/0261 |
| 10,292,370 | B2 * | 5/2019 | Mobley ................ A01K 11/004 |
| D851,339 | S | 6/2019 | Vivathana |
| 10,356,585 | B2 | 7/2019 | Ling et al. |
| 10,444,374 | B2 | 10/2019 | Park et al. |
| 10,842,129 | B1 * | 11/2020 | Anderton ............. H04W 48/18 |
| 2005/0009376 | A1 | 1/2005 | Gotz et al. |
| 2005/0066912 | A1 | 3/2005 | Korbitz et al. |
| 2006/0197672 | A1 | 9/2006 | Talamas, Jr. et al. |
| 2006/0247847 | A1 | 11/2006 | Carter et al. |
| 2007/0204804 | A1 | 9/2007 | Swanson et al. |
| 2008/0035072 | A1 | 2/2008 | Lee |
| 2008/0036594 | A1 | 2/2008 | Kates |
| 2008/0036610 | A1 | 2/2008 | Hokuf et al. |
| 2008/0272920 | A1 | 11/2008 | Brown |
| 2009/0309789 | A1 | 12/2009 | Verechtchiagine |
| 2010/0097208 | A1 | 4/2010 | Rosing et al. |
| 2010/0139576 | A1 | 6/2010 | Kim et al. |
| 2010/0161271 | A1 | 6/2010 | Shah et al. |
| 2011/0140884 | A1 | 6/2011 | Santiago et al. |
| 2011/0298615 | A1 | 12/2011 | Rich et al. |
| 2012/0111286 | A1 | 5/2012 | Lee et al. |
| 2012/0206454 | A1 | 8/2012 | Alasaarela |
| 2012/0209730 | A1 | 8/2012 | Garrett |
| 2013/0044025 | A1 | 2/2013 | Chiu |
| 2013/0127658 | A1 | 5/2013 | McFarland et al. |
| 2013/0157628 | A1 | 6/2013 | Kim et al. |
| 2013/0179204 | A1 | 7/2013 | Sabarez, II |
| 2013/0225282 | A1 | 8/2013 | Williams et al. |
| 2013/0271281 | A1 | 10/2013 | Jessop |
| 2013/0332064 | A1 | 12/2013 | Funk et al. |
| 2013/0340305 | A1 * | 12/2013 | Mobley ................ A01K 11/008 40/300 |
| 2014/0002239 | A1 | 1/2014 | Rayner |
| 2014/0002307 | A1 | 1/2014 | Mole et al. |
| 2014/0012094 | A1 | 1/2014 | Das et al. |
| 2014/0048019 | A1 | 2/2014 | So |
| 2014/0261235 | A1 | 9/2014 | Rich et al. |
| 2014/0320347 | A1 | 10/2014 | Rochelle et al. |
| 2014/0335887 | A1 | 11/2014 | Liu et al. |
| 2014/0352632 | A1 | 12/2014 | McLaughlin |
| 2015/0065167 | A1 | 3/2015 | Scalisi |
| 2015/0107531 | A1 | 4/2015 | Golden |
| 2015/0181840 | A1 | 7/2015 | Tupin, Jr. et al. |
| 2015/0219767 | A1 | 8/2015 | Humphreys et al. |
| 2015/0269624 | A1 | 9/2015 | Cheng et al. |
| 2016/0007888 | A1 | 1/2016 | Nieminen et al. |
| 2016/0097861 | A1 | 4/2016 | Li et al. |
| 2016/0150362 | A1 | 5/2016 | Shaprio et al. |
| 2016/0178392 | A1 | 6/2016 | Goldfain |
| 2016/0189507 | A1 | 6/2016 | Rayner |
| 2016/0205898 | A1 | 7/2016 | Perrine |
| 2016/0259061 | A1 | 9/2016 | Carter |
| 2016/0358432 | A1 * | 12/2016 | Branscomb ............. H04L 61/35 |
| 2017/0066464 | A1 | 3/2017 | Carter et al. |
| 2017/0127652 | A1 * | 5/2017 | Shen .................... G06K 9/0063 |
| 2017/0265432 | A1 | 9/2017 | Anderton et al. |
| 2017/0372580 | A1 | 12/2017 | Vivathana |
| 2017/0374510 | A1 | 12/2017 | Solinsky et al. |
| 2019/0281794 | A1 * | 9/2019 | Ehrman ................ A01K 27/001 |
| 2019/0340876 | A1 * | 11/2019 | Northrup ................ H04L 63/08 |
| 2020/0349560 | A1 * | 11/2020 | Samples ............. G06F 21/6245 |
| 2021/0176959 | A1 * | 6/2021 | Haj-Hariri ........... A01K 29/005 |

FOREIGN PATENT DOCUMENTS

| | | |
|---|---|---|
| CN | 203261980 U | 11/2013 |
| CN | 203302135 U | 11/2013 |
| CN | 206101253 U | 4/2017 |
| CN | 105393139 B | 7/2019 |
| FR | 2869691 A1 | 11/2005 |
| GB | 201614880 | 10/2016 |
| JP | 10260055 A | 9/1998 |
| JP | 10295212 A | 11/1998 |
| JP | 4787762 B2 | 10/2011 |
| JP | 2015139667 A | 8/2015 |
| KR | 102265654 B1 | 6/2021 |
| TW | M471754 U | 2/2014 |
| TW | M541078 U | 5/2017 |
| WO | 1997024577 A3 | 10/1997 |
| WO | 2000057692 A1 | 10/2000 |
| WO | 2014070924 A1 | 5/2014 |
| WO | 2014151064 A1 | 9/2014 |
| WO | 2014182420 A2 | 11/2014 |
| WO | 2015173712 A1 | 11/2015 |
| WO | 2016067116 A1 | 5/2016 |

OTHER PUBLICATIONS

Partial Search Report dated Nov. 11, 2021 issued in EP Patent Application No. 19767830.3.
Chinese Office Action dated Dec. 20, 2021 issued in Chinese Patent Application No. 201980030138.7.
Alvaro Llaria; Geolocation and Monitoring Platform for Extensive Farming in Mountain Pastures ("Llaria"); IEEE International Conference on Industrial Technology (ICIT), pp. 2420-2425; Mar. 19, 2015.
D. M. Anderson; Virtual Fencing—Past, Present and Future ("Anderson II"); The Rangeland Journal vol. 26, pp. 65-78.
Johnathan Chang, et al.; Wireless Pet Containment ("Chang"); Rutgers University, Electrical and Computer Engineering Department, Capstone Design Projects, Team Project No. SP16-002; Feb. 22, 2016.
W. Randolph Franklin, PNPOLY—Point Inclusion in Polygon Test W. Randolph Franklin (WRF), May 18, 2005, https://web.archive.org/web/20050518083531/http://www.ecse.rpi.edu/Homepages/wrf/Research/Short_Notes/pnpoly.html ("Franklin").

(56) References Cited

OTHER PUBLICATIONS

Kai Hormann, et. al.; The Point in Polygon Problem for Arbitrary Polygons ("Hormann"); Computational Geometry, vol. 20 Issue 3; Nov. 2001.
Alejandro Weinstein; Distance from a Point to a Polygon ("Weinstein"); Matlab Central File Exchange; Apr. 1, 2008.
Donald H. House, Chapter 9—Raycasting Polygonal Models, Dec. 28, 2013, https://web.archive.org/web/20131228085233/http://people.cs.clemson.edu/~dhouse/courses/405/notes/raypolygon.pdf ("House").
Andrea Antonia Serra, et al.; A Low-Profile Linearly Polarized 3D PIFA for Handheld GPS Terminals ("Serra"); IEEE Transactions on Antennas and Propagation, vol. 58, No. 4, pp. 1060-1066; Jan. 26, 2010.
Paul D Groves, et al.; Context Detection, Categorization and Connectivity for Advanced Adaptive Integrated Navigation ("Groves"); Institute of Navigation GNSS+ 2013, Sep. 16-20, 2013, Nashville, TN, USA; Sep. 20, 2013.
Jeffrey David Miller; A Maximum Effort Control System for the Tracking and Control of a Guided Canine; A dissertation submitted to the Graduate Faculty of Auburn University in partial fulfillment of the requirements for the Degree of Doctor of Philosophy; Dec. 13, 2010; 216 pages.
Arun Vydhyanathan, et al.; The Next Generation Xsens Motion Trackers for Industrial Applications ("Xsens"); 2015 Whitepaper published by Xsens regarding Motion Trackers (Version 2.0.1); 2015.
SiRF Technology Inc.; SiRF Demo UserGuide ("SiRF"); Mar. 2016.
Stefan Schirra; How Reliable are Practical Point-in-Polygon Strategies? ("Schirra"); 16th European Symposium on Elgorithms (ESA); 2008.
Collision Course II: Ray-Polygon-Intersection ("Claus"); Phys.ik.ex; Apr. 28, 2016.
LMU User's Guide ("LMU"); CalAmp DataCom Inc.; Dec. 2009.
Salvatore John Giunta; Garmin DC50 Dog Collar ("Garmin DC50"); 2013.
The Whistle GPS Pet Tracker & Activity Monitor ("Whistle"); Whistle Labs Inc.; 2015.
Tractive GPS Pet Tracker ("Tractive"); Tractive GmbH; 2013.
Tagg—The Pet Tracker ("Tagg"); Snaptracs Inc./Qualcomm Incorporated; 2011.
NoFence; Nofence AS; 2016.
Directional Virtual Fencing (DVF) Devices ("DVF"); United States Department of Agriculture Research / Massachusetts Institute of Technology; 2007.
Invisible Fence Brand GPS 2.0 ("Invisible Fence"); Invisible Fence, Inc.; 2015.
PeTrak Electric Fence ("PeTrak"); PeTrak, LLC; 2012.
Wolf-Tek Pet Collar ("Wof-Tek"); Wolf-Tek, LLC; 2015.
Mastrack Tracking System ("MasTrack"); MasTrack, LLC; 2015.
GPS Trackit ("GPS Trackit"); GPS Trackit, LLC; 2013.
Life 360 Family Safe Assist and Driver Protect ("Life360"); Life360 Inc.; May 25, 2016.
Geozilla Family Locator ("GeoZilla"); GeoZilla, Inc.; Apr. 2, 2016.
Fleetsat GPS Tracking Solutions ("Fleetsat"); Fleetsat Inc.; Jan. 3, 2015.
Trimble Aardvark DR + GPS ("Aardvark"); Trimble Navigation Limited; Jun. 29, 2012.
Round Solutions Nano Tracker Tracking Device ("NanoTracker"); Round Solutions GMBH & CO KG; Apr. 18, 2016.
Zack Butler, Peter Corke, Ron Peterson, Daniela Rus; Virtual Fences for Controlling Cows; Dartmouth College Department of Computer Science; CSIRO Manufacturing & Infrastructure Technology Brisbane; MIT Computer Science and Artificial Intelligence Laboratory; New Orleans, LA; Apr. 2004; 9 pages.
Yilmaz Kemal Yüce, et al.; An alternative approach to overcome ethical issues of geotracking patients with Alzheimer's disease; 7th International Symposium on Health Informatics and Bioinformatics; 2012.
Bogdan Tărnaucă, et al.; Using Complex Event Processing for implementing a geofencing service; IEEE 11th International Symposium on Intelligent Systems and Informatics (SISY); Nov. 14, 2013.
Arun Vydhyanathan et al.; The Next Generation Xsens Motion Trackers for Industrial Applications; Xsens; 2015; 9 pages.
Berbakov et al.; Smart-Phone Application for Autonomous Indoor Positioning; Proceedings of the IEEE International Instrumentation and Measurement Technology Conference; May 14, 2015; pp. 670-374.
How to check if a given point lies inside or outside a polygon?—Geeks for Geeks, Jul. 11, 2013, https://web.archive.org/web/20130715200034/http://www.geeksforgeeks.org/how-to-check-if-a-given-point-lies-inside-a-polygon ("Geeks").
Vivek Shah, When is a Point Inside a Polygon?, May 17, 2013, https://web.archive.org/web/20130517010213/http://cgatglance.blogspot.com/ ("Shah").
Collision Course II: Ray-Polygon-Intersection, Apr. 28, 2016, https://web.archive.org/web/20161021075420/http://phys.ik.cx/ ("Claus").
A. Bahga and V. Madisetti, "Cloud-Based Information Technology Framework for Data Driven Intelligent Transportation Systems," Journal of Transportation Technologies, vol. 3 No. 2, 2013, pp. 131-141. doi: 10.4236/jtts.2013.32013.
Prasad, S., Weeks, M., Zhang, Y., Zelikovsky, A., Belkasim, S., Sunderraman, R., & Madisetti, V. (2002). Mobile Fleet Application using Soap and System on Devices (SYD) Middleware Technologies. Communications, Internet, and Information Technology.
Madisetti, Vijay, et al. (2004). SyD: A Middleware Testbed for Collaborative Applications over Small Heterogeneous Devices and Data Stores. 3231. 352-371. 10.1007/978-3-540-30229-2_19.

\* cited by examiner

CORRECTIVE COLLAR UTILIZING GEOLOCATION TECHNOLOGY

CROSS-REFERENCE TO RELATED APPLICATIONS

This application claims the benefit, under 35 U.S.C. § 119(e), of U.S. Provisional Patent Application No. 62/642,911, filed 14 Mar. 2018, and U.S. Provisional Patent Application No. 62/779,243, filed 13 Dec. 2018, the entire contents and substance of which are incorporated herein by reference in their entirety as if fully set forth below.

BACKGROUND

Pet owners who reside on a property lacking a physical fence often rely on specialized collars to prevent their pets from leaving the property. Correction collars, such as those that provide one or more electric shocks to the pet, are sometimes used, for example, to discourage the animal from crossing a boundary of the property and/or wandering into a road. Some correction collars can be remotely actuated, such as by a pet owner using a handheld remote control for the correction collar. These systems typically require the pet owner to continuously observe the pet in order to actuate the collar when, for example, the pet approaches a boundary of the property and/or a road. The remote control of these systems typically uses a radio frequency (RF) transmitter to send actuation signals to the collar, and thus, the usefulness of these systems is dependent on the pet staying within a capable range of the RF transmitter. Should a pet travel beyond the capable range of the RF transmitter, the pet owner would be unable to actuate the collar.

Other correction collar systems exist that do not require such vigilant observance on the part of the pet owner. For example, in-ground wired systems generally include a wire that is buried along the boundaries of a property, which may provide a precise electronic boundary that mirrors the physical boundary of the property regardless of the shape of the property. These systems typically emit a signal from the buried wire, and as the pet approaches the wire (i.e., the boundary), a signal is received by the collar from the wire, causing the collar to lightly "correct" (e.g., emit a noise, emit an electric shock, spray a liquid, and/or any other warning) the pet. As the pet gets closer to the boundary, the intensity of the correction is increased, aiming to discourage the pet from crossing the boundary. These systems have several disadvantages. For example, installing the wire is a labor-intensive process, which also means that pet owners typically hire a third-party to install the wire. This in turn adds to the cost of an already expensive system. Installation may also be difficult or impossible due to, for example, driveways, patios, rocks, and other structures or obstacles. Further, the boundary wires of an in-ground wired system can be broken by lawn work (e.g., digging or mowing), tree growth or planting, or the digging of third parties, such as a utility company. Also, these systems are typically hardwired to an electricity source and are thus susceptible to power outages. Should power to the in-ground wired system be interrupted, the pet would be free to escape the property without correction. In addition, such systems are useful only at the property on which they are installed, and the electric boundary is not easily adjustable (if at all) after installation. Moreover, some pets are able to withstand the initial discomfort of the one or more corrections and are able to cross the boundary. As the pet, which is not beyond the boundary of the pet owner's property, moves away from the electric boundary of the in-ground wired system, the collar ceases to correct the pet. Should the pet attempt to return home, the pet would necessarily approach the electric boundary (from the outside of the property), causing the collar to correct the pet and dissuading the pet from reentering the boundaries of the property. Thus, should a pet initially escape from the pet owner's property, an in-ground wired system may actually delay or prevent a pet from returning the pet owner's property.

Other existing systems that do not require in-ground wiring generally include less expensive wireless systems. Typically, these systems emit a signal from a short-range RF transmitter installed in a base station. The signal is received by a receiver installed in the collar, and when the receiver is moved to a position beyond a predetermined range from the base station, the collar is caused to correct the pet. In some systems, variable corrections can be provided based on the distance of the receiver (and in turn the collar and the pet) from the base station. For example, at a first distance, the collar may emit a warning sound; at a second distance, the collar may emit a low-intensity electric shock; and at a third distance, the collar may emit a higher-intensity electric shock. These systems also have several disadvantages. For example, these systems have limited ranges due to various government regulations. Typically, the ranges of such systems are 300-1,000 feet. Further, the "boundary" of the system is not customizable to mirror the physical boundaries of a pet owner's property. Instead, the theoretical boundary of the system is a circle having a radius that is a predetermined distance from the base station. But in practice, the actual boundary of the system is highly variable due to the nature of RF transmission. That is, the range of the system (and thus the boundary) can be influenced by factors including interference from other RF signals, multipath propagation, obstacles and other obstructions, reflections, etc. This may result in unintended corrections and/or certain portions of a pet owner's physical property being outside the boundary of the wireless system such that the pet cannot enjoy the full area of the property. Also, the boundary of the wireless system may extend beyond the physical boundary of the property such that the pet is permitted (by the system) to move outside the confines of the pet owner's property. In addition, such systems require both the base station and the collar to be fully functional, which increases the chance of an overall system malfunction. Should the base station become damaged, the overall system may become inoperable.

Some systems exist that include geolocation capabilities (e.g., via a global positioning system (GPS)). Certain geolocation-enabled systems include a geolocation tracking device installed in the collar (i.e., a tracking collar) and a handheld remote control for use by the pet owner. Generally, such systems are used in the sporting market (e.g., for use with hunting dogs) for use in situations in which the dog is permitted to roam freely in a relatively unbounded area. The location of the tracking collar is typically tracked and then transmitted to the remote control via short-range RF. While such systems may be useful in some situations, such as hunting with trained hunting dogs, these systems are not very useful regarding more common domestic pets. Such tracking systems typically place no restriction on the areas in which the pet is able to freely travel, and once the pet travels beyond the capable range of the remote control, the pet can no longer be tracked. And while some tracking systems may include a correction device in the collar that can be actuated via the remote control, a pet owner would be required to continuously observe the pet's location and manually trigger corrections whenever the pet travels to a location beyond the pet owner's liking.

Some geolocation-enabled systems may utilize a wide area communication system, such as by a cellular network and/or a wide area network (e.g., the internet), to transmit the location of the pet to the pet owner. Certain geolocation-enabled systems permit the owner to configure geo-fences, which is a virtual perimeter for a real-world geographic area. Typically, in such systems, whenever the pet travels outside the geo-fence, the system notifies the owner that the pet has left the geo-fenced area. While such systems may be useful in determining that a pet has run away or otherwise left the geo-fenced area and in assisting in located the escaped pet, these systems fail to provide any initial deterrent to the pet to discourage the pet from leaving the geo-fenced area. Such systems also fail to provide any correction to the pet to guide the pet back to the geo-fenced area. As a result, these systems are typically used as a secondary failsafe in the event the pet escapes from a primary containment system, such as a physical fence.

Additionally, some existing collars include correction technology to correct undesirable animal behavior, such as barking. These systems are typically configured to detect sound (e.g., barking), and subsequently apply a correction. As will be appreciated, however, undesired animal behaviors extend beyond barking and may include other behaviors such as jumping on people, running away from an owner during a walk, and escaping a yard or some other predetermined area, as non-limiting examples.

Further, leashes are commonly used by pet owners to restrain pets while outside the home. Existing leashes are typically physical restraints, such as a rope, cord, or strap, and are generally available in various lengths. Adjustable leashes are also available, which permit a user to alter the length as desired or necessitated. For example, a short leash length may be appropriate for in dangerous, highly-trafficked areas, such as city sidewalks, while a longer leash length may be permissible in less dangerous areas, such outdoors along hiking paths. The leash permits the pet owner to restrain the pet near the owner without fear of the pet running away, as well as enabling the owner to maintain control of the pet. Such leashes, however, may place a physical strain on both the owner and pet. For example, a pet owner may be required to exert a significant amount of strength to control the pet, particularly with respect to large pets and/or when the pet becomes distracted and suddenly dashes away from the owner (e.g., a dog trying to chase a squirrel). This may result in a sudden jerking action or some other tensioned force, which may cause discomfort or injury to the owner (e.g., the owner's arm or shoulder) and/or the pet (e.g., the pet's neck or torso).

SUMMARY

These and other problems can be addressed by embodiments of the technology disclosed herein. The disclosed technology can include a collar and wireless fence system having geo-fencing capabilities and configured to provide corrections to the animal wearing the collar when the animal leaves the geo-fenced area and/or provide corrections to lead the animal back to the geo-fenced area.

The disclosed technology can include a collar comprising a strap configured to be worn by an animal or a person, a power source, memory storing instructions, and a processor configured to perform the instructions. The collar can include at least one of a communication interface configured to transmit and receive data, an accelerometer in communication with the processor, and a geolocation sensor in communication with the processor.

The collar can be configured to receive at least one of first geo-fence data and second geo-fence data. The first geo-fence data can be indicative of a first predetermined geographical area in which it is permissible for the collar to be located. The second geo-fence data can be indicative of a second predetermined geographical area in which it is impermissible for the collar to be located.

The collar can be configured to output a first corrective action in response to determining that the collar is located inside the first predetermined geographical area and within a predetermined distance from a boundary of the first predetermined geographical area.

The first corrective action can be at least one of an emission of light, a vibration, output of an audible warning via a speaker of the collar, and output of a pre-recorded voice command via the speaker.

The collar can be configured to output a first corrective action in response to determining that (i) the collar is located (a) inside the first predetermined geographical area and (b) within a predetermined distance from a boundary of the first predetermined geographical area and (ii) the animal wearing the collar is moving toward the boundary of the first predetermined geographical area.

The collar can be configured to output a first corrective action in response to determining that (i) the collar is located (a) inside the first predetermined geographical area and (b) within a predetermined distance from a boundary of the first predetermined geographical area and (ii) the animal wearing the collar is facing the boundary of the first predetermined geographical area.

The collar can be configured to output a second corrective action in response to determining that the collar is located outside the first predetermined geographical area The collar can be configured to output a second corrective action in response to determining that the collar is located inside the second predetermined geographical area.

The second corrective action can be at least one of providing an electrical shock, spraying a liquid, and outputting a pre-recorded voice command via a speaker of the collar.

The collar can include a magnetometer, and the magnetometer can be configured to determine a direction in which an animal wearing the collar is facing.

The collar can be configured to determine that the collar is outside the first predetermined geographical area and determine a current location and a current orientation of the collar. The current orientation can correspond to a direction in which the collar is facing and can be based at least in part on data received from the magnetometer. The collar can be configured to determine a return path to the first predetermined geographical area and instruct, via one or more corrective actions, the animal wearing the collar to orient itself in a direction to follow the return path.

The collar can be further configured to determine that the current location of collar has deviated from the return path and instruct, via one or more corrective actions, the animal wearing the collar to orient itself in a direction to follow the return path and to move in a direction to follow the return path.

The collar can be configured to determine an accuracy of current geolocational data corresponding to a current location of the collar and, in response to determining the accuracy is below a predetermined threshold, restrict output of any corrective actions.

The collar can be configured to output a user-defined corrective action according to instructions received from a user device.

The collar can be configured to operate in a plurality of operating modes. At least some of the operating modes can include a set of operational rules for at least one component of the collar. The plurality of operating modes can include at least one of an outdoor mode, an indoor mode, a low power mode, a training mode, an active mode, a rest mode, a leash mode, a pet relief mode, and a lost mode.

The collar can be configured to determine a current operating mode of the plurality of operating modes based on data received from at least one of the accelerometer, the geolocation sensor, a camera integrated into the collar, a remotely located camera, a temperature gauge integrated into the collar, a magnetometer integrated into the collar, a biometric sensor integrated into the collar, and one or more short-range wireless beacons.

The collar of claim 15, wherein the collar is configured to distinguish between the indoor mode and the outdoor mode based on at least one of determining a proximity of the collar to the one or more short-range wireless beacons, determining a current location of the collar and comparing the current location of the collar to a known location of an indoor area, and comparing a current temperature of the collar to a local outdoor temperature. The current temperature of the collar can be determined by the temperature gauge of the collar, and the local outdoor temperature can be received from an outdoor temperature data source.

The collar can be configured to issue corrective actions from a first plurality of corrective actions when the collar is located outdoors and corrective actions from a second plurality of corrective actions when the collar is located indoors.

The disclosed technology can include a method for providing an automatic wireless leash, which can include determining a current distance between a current location of a smart collar a current location of a mobile computing device and, in response to determining the current distance is greater than a predetermined leash distance, issuing a corrective action. The corrective action can be a directional command based at least in part on data received from a magnetometer of the collar.

The disclosed technology can include a method for providing a user-controlled wireless leash. The method for providing a user-controller wireless leash can include detecting a spatial gesture, such as an accelerometer of a mobile computing device, and comparing detected gesture data indicative of the detected spatial gesture to one or more stored gesture data. Each stored gesture data can correspond to a user command. The method for providing a user-controller wireless leash can include determining, based on the comparison, a level of similarity between the detected gesture data and at least one of the one or more stored gesture data and, in response to determining the level of similarity is above a predetermined threshold, transmitting the user command to a smart collar such that the smart collar can issue a corrective action.

Additional features, functionalities, and applications of the disclosed technology are discussed in more detail herein.

BRIEF DESCRIPTION OF THE FIGURES

Reference will now be made to the accompanying figures, which are not necessarily drawn to scale, and wherein.

DETAILED DESCRIPTION

Figure 1:
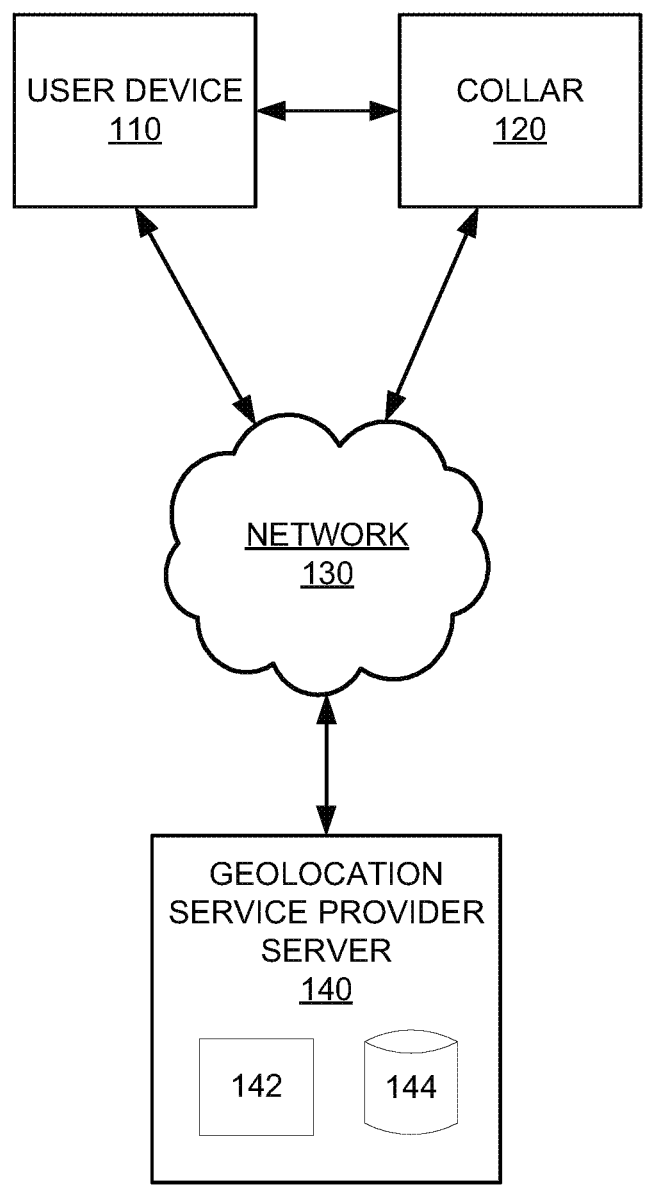
FIG. 1 is a diagram of an exemplary system, according to the present disclosure.

Throughout this disclosure, certain examples are described in relation to wireless fence systems including pet collars having geolocation and/or geo-fencing capabilities. But the disclosed technology is not so limited. The disclosed technology can be effective in locating, herding, and/or maintaining in a predetermined location livestock or other animals. The disclosed technology can be effective in discouraging wild animals, such as deer, from crossing roads or other areas dangerous to the wild animals, people, or people's property. Moreover, the disclosed technology can be effective locating young children or elderly persons who are lost and/or guiding such lost persons to a safe location.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

The disclosed technology relates to a pet collar that can be configured to determine its geolocational position and evaluate that position with respect to the geo-fence of a predetermined, geo-fenced area, which can correspond to a "safe zone" (or a predetermined "restricted zone"). If the collar determines that its position is inside a safe zone but is near the geo-fence (i.e., border of the geo-fenced area), the collar can be configured to provide a warning "correction" (e.g., a light, a vibration, an audible warning or pre-recorded voice command). As used herein, the terms "correction" and "corrective action" are used interchangeably. If the collar determines that it is outside a predetermined safe zone, the collar can also be configured to provide a stronger correction (e.g., a shock, a spray of liquid) to discourage the pet from continuing away from the safe zone. The collar can also be configured to guide the pet back to the safe zone such as by varying the strength and/or type of correction provided based at least in part on the distance of the collar from the geo-fence or orientation of an embedded compass (e.g., determining whether the animal wearing the collar is headed away from or towards a particular area). Various commands can also be remotely transmitted by a user and to the collar at any time via a user device. The user device can also be configured to display various characteristics of the collar, such as its current or historical locations, its heading, and/or a current physical activity of the animal wearing the collar, such as running or walking. Various aspects and functionalities of the disclosed technology are discussed more fully below.

FIG. 1 is a diagram of an example system that can be configured to perform one or more processes that can determine a geographic location of an animal wearing a collar and/or provide corrections to the animal via the collar based on the animal's geographic location with respect to a geo-fence. The components and arrangements shown in FIG. 1 are not intended to limit the disclosed embodiments as the components used to implement the disclosed processes and features may vary.

A user device 110 (e.g., a mobile phone, smart watch, tablet computer, portable laptop computer, or other computing device) can be in communication with a collar 120 having geolocation capabilities. The disclosed technology can include communication between the collar 120 and multiple user devices 110. For example, a user's mobile phone and the user's smart watch can be in communication with the collar 120. As a more specific example, the user can adjust settings via one or more user devices 110 (e.g., via a laptop computer or a mobile device), and the user can interact with the collar 120 via the same or other user devices 110 (e.g., a smart watch can be used as an anchor point for wireless leash, as described more fully below. The collar 120 can include a geolocation sensor (GLS) 360. The collar 120 can be capable of transmitting data—such as location data corresponding to a geographic location and/or a compass heading (as described more fully below) of the collar 120—and can transmit the data to the user device 110 directly and/or via a network 130. The user device 110 can include an accelerometer 350 or some other suitable motion-detecting device.

The collar 120 and/or user device 110 can be in communication with a geolocation service provider (GLSP) server 140, and the GLSP server 140 can be configured to determine a geographic location of the collar 120 (and in turn, the animal wearing the collar 120) based at least in part on location data received from the collar 120. Alternately, one, some, or all of the steps performed by the GLSP server 140 can be performed by employing GLSP processor 142 and GLSP memory 144.

The geolocation system (e.g., the GLS 360 and/or the GLSP server 140) can be configured to increase location accuracy by transmitting to a GPS receiver of the collar 120 remotely provided GPS correction data, such as real-time kinematic (RTK) positioning data, as a non-limiting example. The collar 120 can be configured to determine an effectiveness of the geolocation system, such as, by comparing geolocation data to other location-specific data (e.g., determining a location of the collar 120 using WiFi signal strength, short-range wireless beacons, or other methods and comparing the determined location to the geolocation data to calculate a geolocation accuracy), receiving status data indicative of the geolocation system's functionality, or other information indicative of the accuracy, effectiveness, or reliability of the geolocation system. The collar 120 and/or the user device 110 can be configured to provide an alert, notification, light (e.g., LED) or other indication that the geolocation system's accuracy, effectiveness, or reliability is below a predetermined threshold, such that it is not recommended that the user rely solely on the collar 120's geolocation system until the geolocation system's accuracy effectiveness, or reliability returns to above the predetermined threshold. The collar 120 can be configured to adjust rules corresponding to application of corrective actions (e.g., whether to produce a warning sound, vibration, or shock; the intensity of a shock) based on the current accuracy, effectiveness, or reliability of the geolocation system. For example, if the location of the collar 120 is not presently reliable, the collar 120 can be configured to normally produce a corrective action if it is determined the collar 120 is one foot beyond a boundary of a geo-fenced location, but upon determining that the geolocation's system is below a predetermined reliability or accuracy threshold, the collar 120 can be configured to restrict or prevent production of a corrective action unless it is determined that the collar 120 is five feet, ten feet, or some other distance from the boundary of the geo-fenced area. Upon determining that the geolocation's system is below a predetermined reliability or accuracy threshold, the collar 120 can be configured to not produce a corrective action unless or until the reliability or accuracy of the geolocation system is returned to above the predetermined reliability or accuracy threshold. As discussed more fully below, the collar 120 can be configured to provide a warning that the conditions or working status of the collar 120 are not favorable to permit the animal wearing the collar 120 to be outside.

Communication between or among the user device 110, the collar 120, and/or the GLSP server 140 can be conducted via the network 130. The network 130 can be of any suitable type, including individual connections via the internet such as cellular or WiFi™ networks. The network 130 can connect the user device 110, collar 120, and/or GLSP server 140 using direct connections such as RF modules, Bluetooth™, Bluetooth™ low-energy (BLE), WiFi™ ZigBee™, ambient backscatter communications (ABC) protocols, USB, or LAN. The information transmitted can be encrypted or otherwise secured, depending on the desired level of data privacy and/or data security.

Similarly, the user device 110, collar 120, and/or the GLSP server 140 can communicate with one another using direct connections such as RF modules, Bluetooth™, BLE, WiFi™, ZigBee™, ABC protocols, USB, or LAN. Depending on whether confidentiality is desired, these connections can be encrypted or otherwise secured.

Figure 2:
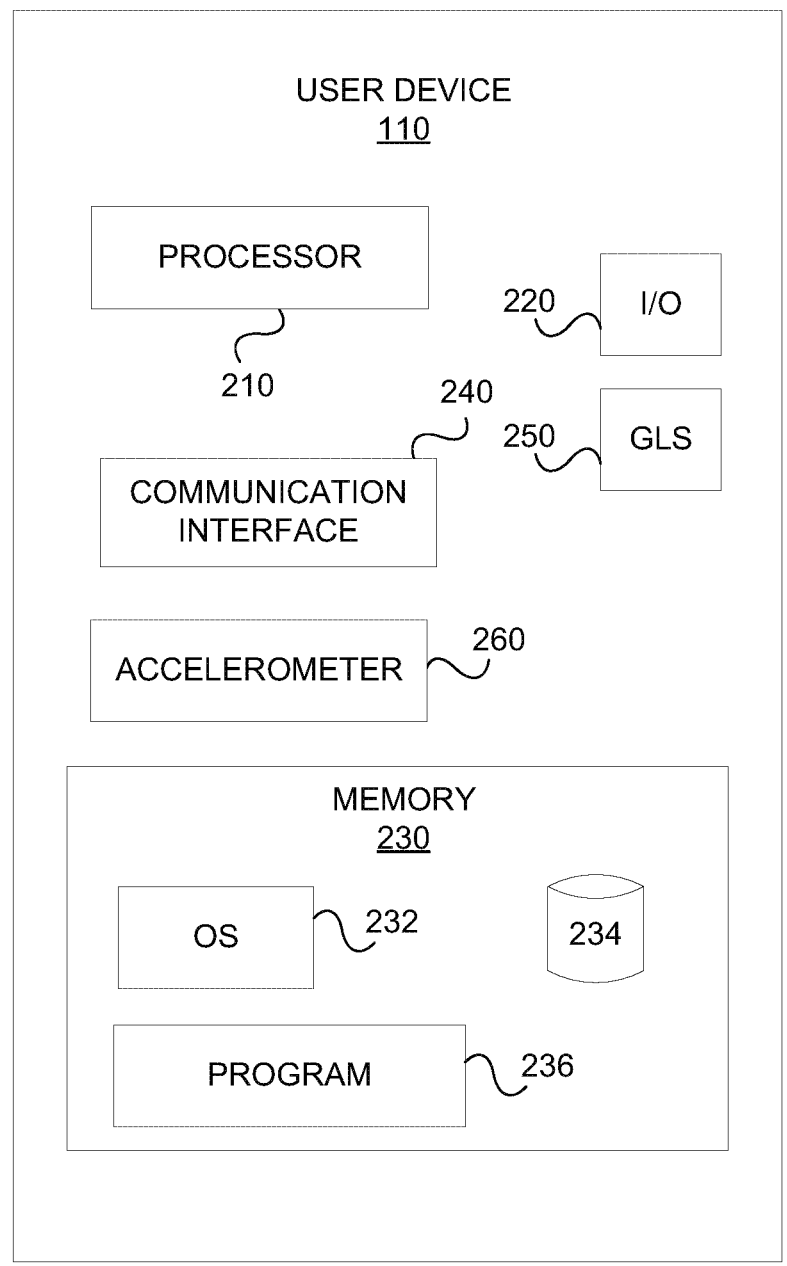
FIG. 2 is a component diagram of an exemplary user device, according to the present disclosure.

An example of the user device 110 is shown in more detail in FIG. 2. As shown, the user device 110 can include a processor 210; an input/output (I/O) device 220; a memory 230 containing an operating system (OS) 232, a storage device 234, which can be any suitable repository of data, and a program 236; and a communication interface 240. The communication interface 240 can include a transceiver. The user device 110 can further include a peripheral interface, a mobile network interface in communication with the processor 210, a bus configured to facilitate communication between the various components of the user device 110, and/or a power source configured to power one or more components of the user device 110. The user device 110 can include a geographic location sensor (GLS) 250 for determining the geographic location of the user device 110. The user device 110 can include a user interface (U/I) device for receiving user input data, such as data representative of a click, a scroll, a tap, a press, or typing on an input device that can detect tactile inputs. The user device 110 can include a display.

The user device 110 can include a peripheral interface, which can include the hardware, firmware, and/or software that enables communication with various peripheral devices, such as media drives (e.g., magnetic disk, solid state, or optical disk drives), other processing devices, or any other input source used in connection with the instant techniques. The peripheral interface can include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

A mobile network interface can provide access to a cellular network, the internet, or another wide-area network. The mobile network interface can include hardware, firmware, and/or software that allows the processor 210 to communicate with other devices via wired or wireless networks, whether local or wide area, private or public, as known in the art. A power source can be configured to provide an appropriate alternating current (AC) or direct current (DC) to power components.

As described above, the user device 110 can be configured to remotely communicate with one or more other devices, such as the collar 120 and/or GLSP server 140. The user device 110 can be configured to communicate with one or more devices via network 170. The user device 110 can be configured to receive and transmit location data and/or account data indicative of a user account associated with user device 110.

The processor 210 can include one or more of an application specific integrated circuit (ASIC), programmable logic device, microprocessor, microcontroller, digital signal processor, co-processor or the like or combinations thereof capable of executing stored instructions and operating upon stored data. The memory 230 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system 232, application programs 236 (including, for example, a web browser application, a widget or gadget engine, and or other applications, as necessary), executable instructions and data. One, some, or all of the processing techniques described herein can be implemented as a combination of executable instructions and data within the memory 230.

The processor 210 can be one or more known processing devices, such as a microprocessor from the Pentium™ family manufactured by Intel™, the Turion™ family manufactured by AMD™, or the Cortex™ family or SecurCore™ manufactured by ARM™. The processor 210 can constitute a single-core or multiple-core processor that executes parallel processes simultaneously. For example, the processor 210 can be a single core processor that is configured with virtual processing technologies. One of ordinary skill in the art would understand that other types of processor arrangements could be implemented that provide for the capabilities disclosed herein.

The user device 110 can include one or more storage devices 234 configured to store information used by the processor 210 (or other components) to perform at least some of the functions disclosed herein. As an example, the user device 110 can include memory 230 that includes instructions to enable the processor 210 to execute one or more applications, network communication processes, and any other type of application or software known to be available on computer systems. Alternatively, the instructions, application programs, or other software can be stored in an external storage and/or can be available from a remote memory over a network. The one or more storage devices can be a volatile or non-volatile, magnetic, semiconductor, tape, optical, removable, non-removable, or other type of storage device or tangible computer-readable medium.

The user device 110 can include memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the user device 110 can include memory 230 that can include one or more programs 236 to perform one or more functions of the disclosed technology. Moreover, the processor 210 can execute one or more programs 236 located remotely from, for example and not limitation, the GLSP server 140. For example, the user device 110 can access one or more remote programs 236, that, when executed, perform at least one function disclosed herein. One or more programs 236 can be configured to receive location data indicative of a geographic location of the user device 110 and/or collar 120. One or more programs 236 can be configured to display, on a display of the user device 110, images illustrative of the geographic location of the user device 110 and/or collar 120. The program(s) 236 can be configured to transmit instructions to the collar 120 to provide a correction (e.g., emit a noise, such as various sounds, voices, music, or other recordings; produce a vibration; emit an electric shock; spray a liquid; and/or produce any other desired warning) to the animal wearing the collar 120.

The memory 230 of the user device 110 can include one or more memory devices that store data and instructions used to perform one or more of the disclosed features. The memory 230 can include software components that, when executed by the processor 210, perform one or more processes consistent with those disclosed herein. The memory 230 can include a geo-fence database for storing data related to one or more geo-fenced areas in which the animal wearing the collar 120 is permitted to freely travel (i.e., a safe zone) or is related to one or more geo-fenced areas from which the animal wearing the collar 120 is restricted (i.e., a restricted zone). The user device 110 can be configured to "record" one or more geo-fences as a user draws virtual boundaries. For example, the user device 110 can be configured to "record" one or more geo-fences as a user draws virtual boundaries on a display depicting a map. The user device 110 can be configured to "record" one or more geo-fences as a user physically travels a desired boundary. For example, the user device 110 can be configured to record, via the GLS 250, location data indicative of a geographic location of the user device 110 as a user carries the user device 110 along a desired boundary.

The user device 110 can include any number of hardware and/or software applications that are executed to facilitate any of the operations. The one or more I/O interfaces can be utilized to receive or collect data and/or user instructions from a wide variety of input devices. Received data can be processed by one or more computer processors as desired in various implementations of the disclosed technology and/or stored in one or more memory devices.

The collar 120 can be configured to communicate with one or more external motion sensors. Such motions sensors can be located, for example, within a user's home. The collar 120 can be configured to receive data from the motion sensors and can be configured to determine, based on the received motion sensor data and/or other data detected by various components of the collar 120, an activity of the animal wearing the collar 120, such as jumping, lying, running, or sitting. Data received from the motion sensors can also be useful to determine animal behaviors while the collar 120 is in training mode, which is described more fully below. Because the motion sensor data can support or supplement data detected by the collar 120, the motion sensor data can increase the accuracy and sensitivity of the collar 120 with respect to detected animal behavior. This can be useful as immediate correction of undesirable animal behavior can be helpful is training an animal, increasing the effectiveness of the animal training.

While the user device 110 has been described above for implementing the techniques described herein, those having ordinary skill in the art will appreciate that other functionally equivalent techniques can be employed. For example, as known in the art, some or all of the functionality implemented via executable instructions can also be implemented using firmware and/or hardware devices such as application specific integrated circuits (ASICs), programmable logic arrays, state machines, etc. Furthermore, the user device 110 can include a greater or lesser number of components than those illustrated and/or described above.

Figure 3:
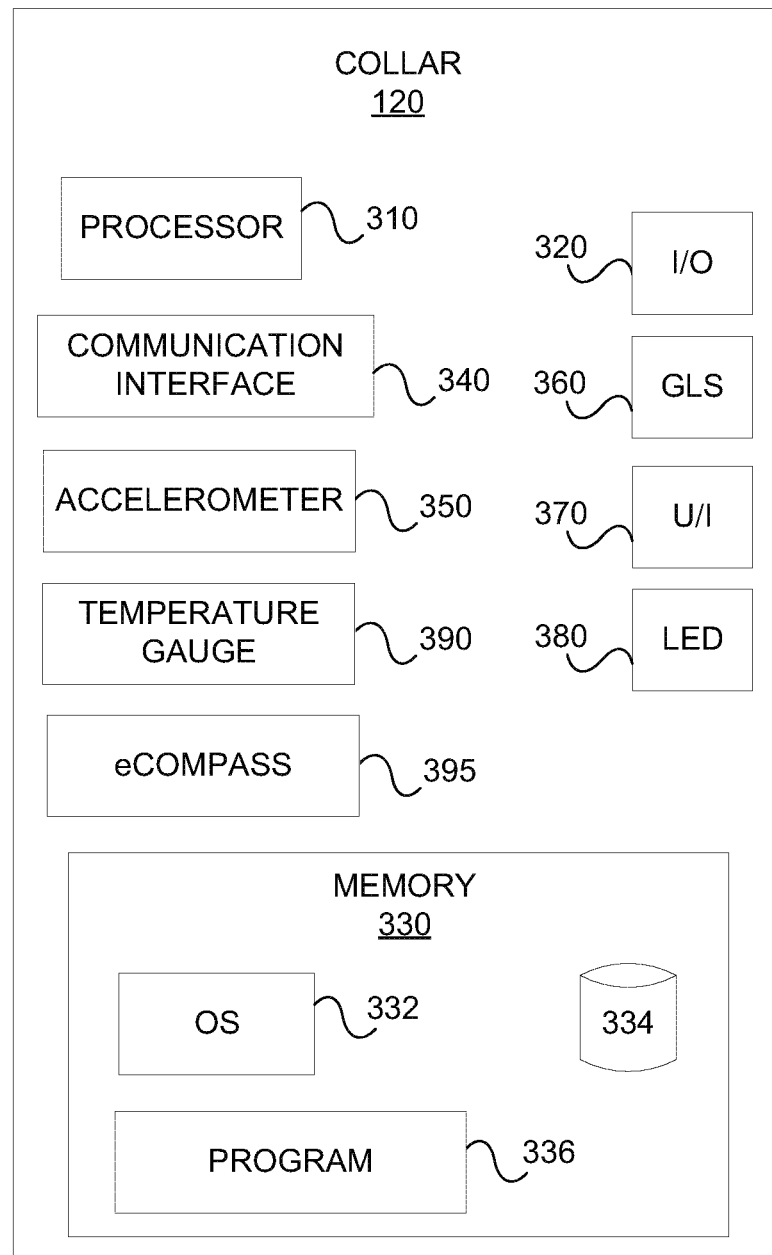
FIG. 3 is a component diagram of an exemplary collar, according to the present disclosure.

An example of the collar 120 is shown in more detail in FIG. 3. As shown, the collar 120 can include a processor 310; an input/output (I/O) device 320; a memory 330 containing an operating system (OS) 332, a storage device 334, which can be any suitable repository of data, and/or a program 336; a communication interface 340; an accelerometer 350 or other suitable motion-detecting device; a geographic location sensor (GLS) 360 for determining the geographic location of the collar 120; a user interface (U/I) device 370 for receiving user input data, such as data representative of a click, a scroll, a tap, a press, or typing on an input device that can detect tactile inputs; and/or a light-emitting diode (LED) 380 or other suitable light-emitting device. The collar 120 can include a temperature gauge 390 (e.g., a thermometer, thermocouple, resistive temperature measuring device, thermistor, or any other temperature measuring device). The collar 120 can be configured to adjust certain settings of the collar 120 depending on whether the collar 120 is located indoors or outdoors. For example, if the collar 120 determines it is located indoors, the collar 120 can be configured to adjust the type and/or severity of corrections applied, power usage of the collar 120 (e.g., disable the GLS 360 while the collar 120 is indoors), or other features. The collar 120 can include multiple temperature gauges 390, and one or more temperature gauges can be configured to measure ambient air temperature and one or more temperature gauges can be configured to measure a temperature of the animal wearing the collar 120. The collar 120 can include one or more biometric sensors that can be configured to measure or detect biometric information associated with the animal wearing the collar 120. The biometric sensors can include one or more sensors configured to measure heart rate data, blood pressure data, hormonal data, audio data (e.g., data corresponding to a cat's meow, a dog's bark, a cough, a sneeze, or other sounds created by the animal wearing the collar 120), respiratory data, brainwave data, olfactory data (e.g., data corresponding to a smell of the animal wearing the collar 120). The collar 120 can include an eCompass sensor 395 (e.g., a magnetometer) to, for example, determine a direction in which the animal wearing the collar 120 is facing. As will be appreciated, an eCompass sensor 395 can enable the collar 120 to determine the animal wearing the collar 120 and the user using the user device 110 are moving in the same direction. The collar 120 can be configured to issue a corrective action upon determining that the animal wearing the collar 120 and the user using the user device 110 are not facing a same or similar direction or if the corresponding paths of the animal wearing the collar 120 and the user using the user device 110 diverge.

The collar 120 can be configured to produce corrections, which can include emitting a noise (such as various sounds, voices, music, or other recordings), producing a vibration, producing a light, emitting an electric shock, spraying a liquid, producing any other desired warning, or any combination thereof. The collar 120 can be configured to emit sounds that are inaudible to the human ear (e.g., sounds similar to that of a dog whistle). The disclosed technology can be configured to enable a user to transmit, via the user device 110, real-time commands to be emitted from the speaker of the collar 120. The communication interface 340 can include a transceiver. The collar 120 can further include a peripheral interface, a mobile network interface in communication with the processor 310, a bus configured to facilitate communication between the various components of the collar 120, an electric shock device, a spray device and spray reservoir, a speaker, and/or a power source configured to power one or more components of the collar 120. The collar 120 can exclude certain components discussed herein. For example, the collar 120 can not include (i.e., omit) an OS, depending on the complexity of the program instructions, which can offer comparative limited functionality (as compared to a collar 120 including an OS) but can also decrease power consumption of the collar 120 (as compared to a collar 120 including an OS).

The power source can include one or more batteries. The batteries can be replaceable. The batteries can be rechargeable. The collar 120 can include solar panels or other components configured to absorb solar energy and convert the absorbed solar energy to electrical energy, and this energy can be stored in the batteries. The collar 120 can be configured to adjust the rate of power use upon, for example, detecting that certain features are not necessary (e.g., disabling GLS 360 while the collar 120 is indoors or when it is determined that the animal is resting) or determining that the power level of the batteries is below a predetermined threshold. The collar 120 can be configured to adjust the rate of power usage upon receipt of a user command, such as a wireless command from a separate user device (e.g., a mobile phone) or a command received at the collar 120 such as via a button disposed on the collar 120. Other energy harvesting technologies, such as motion harvesting or radio frequency harvesting, can also be integrated into the collar 120 and used to collect energy, which can then be converted to electricity and stored in the batteries. The collar 120 can include a display, which can indicate a power level of the batteries and/or whether the batteries need replaced or recharged. The collar 120 can be configured to transmit a battery status of the collar 120 to the user device 110, which can include transmitting an alert indicative of low power or no power. The collar 120 can be configured to transmit an alert to the user device should the collar 120 fall off or otherwise become removed from the animal. The collar 120 can be configured to transmit an alert to the user device 110 if temperatures pass beyond one or more predetermined thresholds.

The collar 120 can include a housing. The housing can enclose some or all of the various components of the collar 120. The housing can be integral with and/or permanently integrated with or attached to a strap (or necklace) configured to be worn by an animal or person. Alternately, the housing can be configured to detachably attach to a strap (or necklace) configured to be worn by an animal or person. The housing can be weather resistant, water resistant, weather proof, or water proof, depending on, for example, the environment in which the collar 120 is to be primarily used. The housing can be configured to provide various levels of solid particle protection, such as IP5x or IP6x protection, depending on, for example, the environment in which the collar 120 is to be primarily used.

The collar 120 can include a camera or a mount for an external camera. The collar 120 can be configured to record videos and/or images and transmit the recorded video and/or images to the user device 110. The collar 120 can include a microphone configured to record audio data associated with the animal. The microphone can record audio, and the audio data can be saved to the memory 330 of the collar 120 for later user. The audio data can be transmitted to the user device 110 in real time. The microphone can be configured to record audio in response to the collar 120 receiving a signal from the user device 110 indicative of an instruction to record audio.

The accelerometer 350 can be configured to detect motion of the collar 120, and upon detection of the collar 120, the processor 310 can be configured to perform certain functions. For example, the collar 120 can be configured such that, upon detection of movement by the accelerometer beyond a predetermined amount of motion, the camera and/or GLS 360 is engaged to record and/or track the activity of the animal wearing the collar 120. Among other advantages, this arrangement can extend the battery life of the collar 120 by reducing the amount time in which the camera and/or GLS 360 are engaged during inactive periods (e.g., when the animal is sleeping). This arrangement can also provide better management of the memory 330 such that memory space is not wasted on recording video or images of the animal or the animal's surroundings during periods of inactivity. The GLS 360 can be configured to record and log the movement of the animal by saving associated data to the memory 330. The saved movement data can later be downloaded or otherwise transferred to the user device 110 for viewing. The movements of the animal can be transmitted in real-time such that, for example, a user can view, via the user device 110, the real-time movements of the animal. As described herein, one or more motion sensors can detect and transmit motion sensor data, which can be used by the collar 120 to determine a current behavior of the animal, such as jumping, resting, or walking.

The memory 330 can include a geo-fence database for storing data related to one or more geo-fenced areas in which the animal wearing the collar 120 is permitted to freely travel (i.e., a safe zone) or is related to one or more geo-fenced areas from which the animal wearing the collar 120 is restricted (i.e., a restricted zone). The memory 330 can include a default safe zone, which can correspond to the property lines of a user's residence. The location of a user's residence can be discovered by a mailing address of the user if, for example, the user ordered the collar 120 for delivery to the user's residence. The memory 330 can include default restricted zones, which can correspond, for example, to all roads. The collar 120 can communicate with the user device 110 (directly or via network 130) to synchronize the safe zones and restricted zones saved on either device. One, some, or all of the safe zones and/or restricted zones can be permanent, which can be useful in cases in which the animal wearing the collar 120 rarely, if ever, leaves a particular location (e.g., livestock on a farm). One, some, or all of the safe zones and/or restricted zones can be temporary or adjustable, which can be useful if the animal wearing the collar 120 often moves to multiple locations. For example, a pet owner can have a primary residence and a vacation home, and in such a scenario, it can be useful to have a safe zone established for both locations. Moreover, the safe zones and/or restricted zones can be configured and/or scheduled (e.g., by a user at the collar 120 directly or via the user device 110) to change according to, for example, the time of day or the day of the week. For example, a pet owner can desire to allow a pet to roam freely throughout the pet owner's property during the day but restrict the pet to the back yard at night.

The disclosed technology can enable a pet owner to, via the user device 110, remotely engage or disengage various sides, sections, or portions of the geo-fence. The collar 120 can be configured to disable corrections if the collar 120 is located within a predetermined distance of the user device 110. For example, the collar 120 can be configured to disable corrections if the distance between the collar 120 and the user device is in a range of 1 foot to 3 feet, 3 feet to 5 feet, 5 feet to 10 feet, or 10 feet to 20 feet. The collar 120 can be configured to calculate the distance between the collar 120 and the user device 110 by comparing the geospatial location of the collar 120 and the user device 110. The collar 120 can be configured to calculate the distance between the collar 120 and the user device 110 using transmitting and detecting short-range radio frequency (RF) signals and calculating distance using RF transmission algorithms, such as Bluetooth™ signal strength measurements. This distance can prove useful, for example, should a pet owner decide to take a pet for a walk or drive the pet to another location. In such scenarios, the collar 120 can disable corrections such that the pet owner can, for example, drive down the driveway without manually disabling the geo-fence and without fear of the pet suffering a false correction. Should the collar 120, subsequent to traveling across the geo-fence while the collar 120 is within the predetermined distance of the user device 110, determine that the collar 120 is outside the geo-fenced area and is not within the predetermined distance of the user device 110, the collar 120 can be configured to transmit a notification to the user device 110 prior to providing a correction to the animal. The notification can request and/or require confirmation from the user prior to providing a correction to the animal. The preceding determinations can be accomplished by the user device 110 and commands regarding whether to provide corrections or pause corrections can be transmitted from the user device 110 to the collar 120.

The disclosed technology can enable a user to choose whether the area inside a particular geo-fence is indicative of a safe zone or a restricted zone, and the user can be enabled to make such a selection on the collar 120 itself or via the user device 110. The collar 120 and/or user device 110 can determine by default that certain areas are restricted zones. For example, the collar 120 and/or user device 110 can be configured to determine that all roadways or bodies of water are restricted zones. One or more programs 336 can be configured to determine whether the location of the collar 120 is approaching or is outside one or more of the geo-fenced areas saved to the memory 330.

The program 336 can be configured to provide a correction (e.g., an audible warning via the speaker of the collar 120, an electric shock provided via the electric shock device of the collar 120) upon determining that the location of the collar 120 is approaching or is outside a geo-fenced area saved to the memory 330. The program 336 can be configured to guide the animal wearing the collar 120 back to a predetermined geo-fenced area upon determining that the location of the collar 120 is outside the saved geo-fenced areas. Upon determining that collar 120 is near a road or other dangerous area, the program 336 can be configured to provide a correction and/or guide the animal away from the road or other dangerous area. Audible warning corrections can be pre-installed on the memory 330 and can include, for example, beeps, bells, whistles, or other noises. The audible warning can be downloaded, installed, or recorded by a user. The audible warning can be recorded by the microphone of the collar 120. The audible warning can be recorded via the user device 110 and transferred from the user device 110 to the collar 120. The volume of the audible corrections can be preset or configurable. For example, the volume of the audible corrections can be increased should the animal wearing the collar 120 be hard of hearing. The volume of the audible warning corrections can be incrementally increased as the collar 120 gets nearer the virtual boundary of a geo-fence.

The program 336 can be configured to determine (or receive indication of) an accuracy of the instant geolocation data and can be configured to adjust the sensitivity of the virtual boundary based at least in part on the accuracy of the instant geolocation data, which can reduce the likelihood of false correction (e.g., corrections that are provided while the collar 120 is still within a permissible area, shock corrections that should have been warning corrections). For example, the collar 120 can typically determine its perceived location within a 5-foot radius of its actual location. This example collar 120 can thus be configured to provide a warning correction when the perceived location of the collar 120 comes within 1 foot of the virtual boundary. This example collar 120 can also be configured to provide a shock correction should the perceived location of the collar 120 travel more than 5 feet beyond the virtual boundary. Should this example collar 120 realize a decreased accuracy of the instant geolocation data due to, for example, a weak or inhibited geolocation signal, the example collar 120 can be configured to dynamically adjust the perceived locations at which corrections are provided. For example, should the accuracy of the example collar 120 decrease to a 10-foot radius, the example collar 120 can be configured to provide a warning correction when the perceived location of the collar 120 should the perceived location of the collar 120 travel more than 7 feet beyond the virtual boundary and to provide a shock correction should the perceived location of the collar 120 travel more than 10 feet beyond the virtual boundary. The amount of consideration given to changes in the locational accuracy of the collar 120 can be customizable by a user and can be selected by a user via the collar 120 itself or via the user device 110. The collar 120 can be configured to eliminate corrections should the locational accuracy of the collar 120 fall below a predetermined threshold. The collar 120 can be configured to provide only certain types of corrections should the locational accuracy of the collar 120 fall below a predetermined threshold. For example, if the locational accuracy of the collar 120 fall below a predetermined threshold, the collar 120 can be configured to only emit warning sounds.

Similarly, the strength of shock corrections can be incrementally increased depending on how long the collar 120 is in a restricted area (or outside a safe area) or how far away from the geo-fence the collar 120 travels. The strength of the shock corrections can be based at least in part on the type of restricted area. For example, roads can be assigned a relatively high shock level as compared to a neighbor's yard. The strength of the shock corrections—both the overall strength of all corrections and the selective strength of corrections associated with certain areas—can be customizable by a user either at the collar 120 itself or via the user device 110.

The collar 120 can be configured to guide an animal back to a predetermined area, such as a safe area within a geo-fence. The collar 120 can achieve this by increasing the strength of corrections as the collar 120 travels away from the geo-fenced area and decreasing the strength of the corrections as the collar 120 travels toward the geo-fenced area. The collar 120 can be configured to determine an orientation of the collar 120, such as by the GLS 360, the eCompass sensor 395, and/or a gyroscope included in the collar 120. The collar 120 can be configured to guide an animal back toward the center of the geo-fence and away from a restricted area based at least in part in on data indicative of the orientation of the collar 120. The collar 120 can be configured to provide directional commands (e.g., turn right or left) based on the projected path of the collar 120 and an upcoming restricted area, obstacle, or other feature (e.g., a road, a waterway). The collar 120 can be configured to determine that the animal wearing the collar 120 has correctly followed a provided directional command, and the collar 120 can be configured to provide positive reinforcement, such as playing an audio recording of the user praising the animal. The collar 120 can be configured to provide negative reinforcement if the collar 120 determines that the animal wearing the collar 120 has not correctly followed a provided directional command, such as by issuing a corrective action. For example, if the animal is inside the geo-fenced area, is located near the geo-fence, and is facing the geo-fence, the collar 120 can be configured to emit an audible correction in the form of a pre-recorded command instructing the animal to stop or turn around. As another example, if the animal is outside the geo-fenced area and is facing the geo-fence, the collar 120 can be configured to emit an audible correction in the form of a pre-recorded command instructing the animal to walk forward. This can be useful in providing initial "self-training" to the animal such that the user is not required to manually train and/or acclimate the animal to the geo-fence and collar system. Additionally, once an animal is initially trained on the system in one location, the animal will be more likely to understand the meaning of various corrections received in other geographic locations. The collar 120 can be configured to provide simpler right/wrong corrections, such that, instead of attempting to direct the animal to turn left or right, the collar 120 can provide a correction until the animal wearing the collar 120 is facing the correct direction. This can be easier for some animals to learn.

The processor 310 can be configured to enable the LED 380 if the location of the collar 120 is outside a geo-fenced area. The collar 120 can include a photosensor, a photodetector, or other light-sensing device, and the processor 310 can be configured to enable the LED 380 if the amount of detected light falls below a predetermined level. The processor 310 can be configured to enable the LED 380 if the location of the collar 120 is outside a geo-fenced area and the amount of detected light falls below a predetermined level. The processor 310 can be configured to enable the LED 380 to indicate a strength and/or determined accuracy of the geolocation signal. The processor 310 can, alternately or in addition, enable a plurality of LEDs 380 to indicate a strength of the battery or the geolocation signal and/or a determined accuracy of the geolocation signal (e.g., by a color-coded scheme, by providing numbers and/or letters via the plurality of LEDs 380). Alternately or in addition, such information can be provided via a display disposed on the collar 120. Information regarding the battery strength, geolocation signal strength, and/or determined accuracy of the geolocation signal can be useful as an indicator for a user as to whether it is an appropriate time for training (e.g., a user may not want to begin training if the collar 120 will require charging in the near future). As discussed below, the processor 310 can be configured to enable the LED 380 when the collar 120 is in a leash mode, which can alert passers-by that the animal wearing the collar 120 is under control of the user via the collar 120.

The collar 120 can be used indoors in conjunction with additional short-range wireless beacons, such as Bluetooth™ emitters. The collar 120 can be configured to not produce corrections, regardless of the proximity of the collar 120 to a geo-fence, upon receipt of a signal from a particular wireless beacon. The collar 120 can be configured to not produce corrections if the received signal from the wireless beacon is within a predetermined threshold, which can be indicative of a close proximity of the collar 120 to the wireless beacon. This can provide a local "safe zone" about the wireless beacon. The wireless beacon can be permanently or semi-permanently installed. For example, a wireless beacon can be installed in known safe zone near the edge of a geo-fence or just beyond a geo-fence to make sure that no correction takes place there. The wireless beacon can be transportable. For example, the wireless beacon can be installed in a car or on a key chain, which can be useful if a pet owner often transports a pet by car.

The collar 120 can be configured to produce a correction upon receiving a signal from a particular wireless beacon that is beyond a predetermined threshold, which can be indicative of a close proximity of the collar 120 to the wireless beacon. For example, placing a wireless beacon on a kitchen countertop can have the effect of discouraging a pet from entering the kitchen. The predetermined threshold (which corresponds to a distance from the wireless beacon) and/or the strength, type, and/or progression of the correction(s) can be selectively adjusted by the user such as at the wireless emitter, at the collar 120 or at the user device 110. The wireless beacon and/or the collar 120 can be configured to record and save analytics corresponding to interactions between the wireless beacon and the collar 120. For example, the analytics can include information indicative of the number of times the collar 120 traveled within a predetermined distance of the wireless beacon, the position of the collar 120 with respect to the wireless beacon as a matter of time, etc.

The collar 120 can be useful for use with, for example, service animals. As will be appreciated, service animals are often trained to "alert" if the owner of the service animal requires help. The collar 120 (such as by accelerometer 350, a microphone)) can be configured to detect that the service animal wearing the collar 120 is "alerting." Upon detecting that the animal is "alerting," the collar 120 can be configured to transmit, to an emergency service provider and/or a predetermined safety contact, a notification requesting help. The notification can include a message indicative of the detected "alert," a time of the detected "alert," and/or a location of the collar 120 and/or user device 110. The collar 120 can issue a recording requesting help and/or can transmit a signal to user device 110 causing user device 110 to issue a recording request help and/or causing user device 110 to transmit a notification to an emergency service provider and/or a predetermined contact.

The collar 120 can include multiple operating modes. For example, the collar 120 can include an outdoor mode (e.g., for use when an animal is outdoors), an indoor mode (e.g., for use when the animal is indoors), a low power mode (e.g., for use when the battery life of the collar 120 is below a predetermined threshold), a training mode (e.g., corresponding to times during which a user is training the animal), an active mode (e.g., times during which the animal is determined to be active), a rest mode (e.g., for decreasing the frequency with which the collar 120 measures and/or transmits data such that battery life can be conserved when it is determined that the animal is sleeping at a location that is a predetermined distance away from a geo-fence boundary), a leash mode (e.g., a mode providing an "electronic leash" for use when the animal is outdoors and being walked by a user carrying the user device 110), a pet relief mode (e.g., for determining when and where the animal defecates or urinates), a lost mode (e.g., for use when the animal is outside a predetermined geofenced area or when the animal is otherwise determined to be "lost"), or any other useful mode. The collar 120 can be configured to be in a single operating mode at a given time, and the collar 120 can be configured to be in two or more operating modes at a given time. For example, while in outdoor mode, the collar 120 can also be in leash mode, pet relief mode, and/or lost mode. One or more modes can be associated with one or more other modes. For example, rest mode can be associated with low power mode, such that when program 336 determines that the animal is resting (e.g., the collar 120 determines an activity level of the animal is below a predetermined activity threshold), the collar 120 can be in low power mode such that the collar 120 measures and/or transmits location data, biometric data or other data at a less frequent rate as compared to when the collar 120 is not in low power mode.

The disclosed technology can enable a user to manually change the operating mode of the collar 120. For example, the user can manually change the operating mode of the collar 120 via program 336, and/or the user can manually change the operating mode of the collar 120 via U/I device 370 (e.g., one or more buttons on the collar 120). The collar 120 can indicate (e.g., via LED 380) in which operational mode the collar 120 is presently operating. Alternately or in addition, the collar 120 can include a display that can be configured to display in which operational mode the collar 120 is presently operating. The program 336 can be configured to dynamically and automatically change between various operating modes based on detected data (e.g., location data of the collar 120 and/or the user device 110, temperature data associated with the temperature of the environment and/or the animal wearing the collar 120, biometric data associated with the animal wearing the collar 120, accelerometer data associated with the collar 120).

Each operating mode can include one or more default settings. For example, the frequency with which certain location data or other information is collected or transmitted can differ depending on a given operating mode (e.g., in lost mode the collar 120 can be configured to transmit a constant stream of location data while in lost mode and the collar 120 can be configured to periodically transmit location data while in a non-lost outdoor mode).

The program 336 can be configured to determine whether the collar 120 is located outdoors or indoors. The program 336 can compare environmental temperature data received from the temperature gauge 390 to local outdoor temperature data to determine whether the collar 120 is located outside. For example, the collar 120 can receive local outdoor temperature data (e.g., from user device 110 and/or a server) and can compare the local outdoor temperature data to the temperature data measured by the temperature gauge 390. Alternately, the collar 120 can transmit measured temperature data to the user device 110 and/or a server, and the user device 110 and/or server can compare the local outdoor temperature data and the temperature data measured by the temperature gauge 390. Regardless of which device performs the comparison, it can be determined that the collar 120 is outdoors if the measured temperature data is within a predetermined range of temperature values or within a predetermined error range with respect to the local outdoor temperature data. The local outdoor temperature data can be received from third party weather service or from some other source. The program 336 (or some other device) can receive an indoor temperature value corresponding to, for example, the home of the user, and the program 336 (or some other device) can compare the detected temperature data to the indoor temperature value to determine if the collar 120 is indoors. The indoor temperature can be assumed to be a predetermined temperature value, such as, for example and not limitation, 72° F. The program 336 can be configured to compare the measured temperature data to the indoor temperature and to the local outdoor temperature data, and the program 336 can be configured to determine if the collar 120 is outdoors or indoors based on if the measured temperature data is closer to the local outdoor temperature data or the indoor temperature, respectively. The program 336 can be configured to determine that the collar 120 is outdoors based on the performance (e.g., speed, signal strength) of GPS signals or other geolocational signals, short-range wireless signals (e.g., Bluetooth signals). The program 336 can be configured to determine that the animal wearing the collar 120 is being transported (e.g., by a car or other vehicle) based at least in part on GPS data. For example, the collar 120 can determine, based on GPS data, that the collar 120 is moving but can also determine, based on other data (e.g., from the accelerometer 350) that the animal wearing the collar 120 is not walking or running. The program 336 can be configured to suspend at least some corrective actions (e.g., corrective actions corresponding to safe zones and/or restricted zones) while the animal is being transported.

One or more short-range wireless transmitters (e.g., beacons) can be positioned near a threshold (e.g., door) of a building, and measured signal strength of a signal transmitted between the collar 120 and the transmitter can be used to determine whether the collar 120 is indoors or outdoors. Upon determining that the collar 120 is in a predetermined area (e.g., waiting outside a door), the collar 120 (or a server) can be configured to transmit a notification to the user device 110 indicating that collar 120 is in the predetermined area, and the notification can indicate that the user should let the animal wearing the collar 120 into the building. Alternately, the user device 110 can receive data indicative of a location of the collar 120 and can provide an alert upon determining that the collar 120 is in the predetermined area. The collar 120, user device 110, and/or server can be configured to determine (e.g., based on a comparison of signal strengths measured by two or more devices in the collar 120, based on geolocation data, beacon proximity, and/or an eCompass direction) a direction in which the animal is facing, and this information can be used to determine if the animal is ready to be let into the building. The collar 120, user device 110, and/or server can accordingly issue a notification for the user to let the animal into the building. This information can be transmitted to an automatic or motorized doggy door, which can automatically permit the animal wearing the collar 120 to ingress or egress the building.

If the program 336 determines that the collar 120 is outdoors, the program 336 can transition the collar 120 into outdoor mode. Transitioning to outdoor mode can include transitioning the power consumption of the collar 120. For example, while outdoors, the use of WiFi™ can be assumed to be limited, and the collar 120 can be configured to disable WiFi™ functionality while the collar 120 is located outdoors. Alternately or in addition, the collar 120 can be configured to enable the GLS 360 while the collar 120 is located outdoors and disable the GLS 360 while the collar 120 is located indoors. Outdoor mode can include one or more different geofences as compared to indoor mode. For example, outdoor mode can include one or more geofences to prevent the animal from leaving the yard or some other area, which is not necessary when the animal is located indoors.

If the program 336 determines that the collar 120 is indoors, the program 336 can transition the collar 120 into indoor mode. Transitioning to indoor mode can include transitioning the power consumption of the collar 120. For example, as described above, the collar 120 can be configured to disable the GLS 360 while the collar 120 is located indoors, and/or the collar 120 can be configured to enable WiFi™ functionality while the collar 120 is located outdoors. Indoor mode can include one or more different geofences as compared to outdoor mode. For example, it can be desired to prevent the animal from entering a bedroom or the kitchen, and as the animal is located indoors, it is unnecessary to prevent the animal from leaving the yard or some other area. Indoor fences (e.g., safe zones and/or unsafe zones) can be established and determined using short-range wireless receivers, such as BLE, which can require comparatively less energy as compared to other systems.

The program 336 can receive data from one or more sensors of the collar 120, such as data measured by the accelerometer 350 and/or by the GLS 360, and can determine, based on the received data, an activity level or an activity type of the animal. The determined activity can correspond to a command received from the animal wearing the collar 120. For example, an animal can be trained to provide, and the collar 120 can be configured to detect, a predetermined activity and/or gesture to indicate a particular need or desire of the animal (e.g., signaling that a user or another person is injured or requires assistance, transmit a request to a user to let the animal outside, transmit a request to a user to provide water and/or food). Such a functionality can be particularly useful with service animals. For example, a service animal can determine that its owner requires medical attention and can perform a predetermined activity and/or gesture. Upon detecting the predetermined activity and/or gesture, the collar 120 can be configured to enable an alert (e.g., via a speaker, LED 380, and/or display of the collar 120) from the collar 120 itself. Upon detecting the predetermined activity and/or gesture, the collar 120 can be configured to transmit an alert or notification to the user device 110. Upon detecting the predetermined activity and/or gesture, the collar 120 can be configured to transmit a call and/or notification to a third party, such as a predetermined contact, emergency service provider, medical care provider, and/or some other contact. The collar 120 can be configured to transmit the call and/or notification via WiFi™, a cellular network, or any other communication method. The collar 120 can be configured to transmit, via the call and/or notification, a location of the collar 120 (e.g., a current location of the collar 120 and/or a location of the collar 120 when the collar 120 detected the predetermined activity and/or gesture). The location of the collar 120 can be determined at least in part on data received from the GLS 360.

The program 336 can be configured to determine an activity type (e.g., running, walking, playing, jumping, sitting, lying down, pet relief) of the animal via data measured by the accelerometer 350, GLS 360, biometric sensor, a camera, or some other sensor, and the program 336 can be configured to learn data patterns (e.g., accelerometer data patterns) associated with the animal over time. For example, the collar 120 can include an internal neural network and, via a collar training mode, a user can be enabled to train the neural network to learn g-level and eCompass data associated with a particular behavior. As will be appreciated, standard learning algorithms can be employed to improve the accuracy of the neural network until the neural network can accurately distinguish and/or identify each learned behavior. The associated of a recent behavior to a specified behavior is performed by the user via the user device 110 (e.g., a smart phone running an application configured to communicate with the collar 120 and the neural network of the collar 120). A particular behavior can be displayed or input or otherwise specified via the user device 110. The program 336 can be configured to transition the collar 120 to a corresponding operating mode based on the determined activity type. For example, the program 336 can determine that the animal is active or can determine that the animal is resting, and the program 336 can transition the operational mode of the collar 120 based on that determination. The program can be configured to adjust the type of corrective action (e.g., vibrations, warning sounds, shocks) depending on the activity determined by the program 336. For example, it can be desirable to provide a severe corrective action if the animal transitions from a resting position or inactive position to jumping up on a person, and it can be desirable to provider a less severe corrective action (or none at all) if the animal transitions from a playing activity type to jumping up on a person as it can be assumed that the person is playing with the animal. The program 336 can determine, based on the activity levels of an animal, that the animal is a "high energy" animal that requires more severe corrective actions (e.g., shocks), as higher energy animals are typically less receptive (or not receptive at all) to less severe corrective actions (e.g., warning sounds, vibrations).

If the program 336 determines that the animal is active, the program 336 can transition the collar 120 to active mode. Active mode can include measuring and/or transmitting measured data at a more frequent rate as compared to rest mode, for example. The active mode can be configured to detect undesirable activity on the part of the animal and can be configured to issue corrective actions aiming to prevent or correct those undesirable activities. For example, while the collar 120 is in active mode (or some other mode), the program 336 can be configured to determine (e.g., based on accelerometer data and/or recorded audible data) a behavior of the animal, such as sleeping, running, jumping, barking, jumping up on a person, or any other behavior. The program 336 can be configured to distinguish desirable or permissible behavior from undesirable behavior. The program 336 can be configured to receive input from a user indicating one or more behaviors that are desirable or permissible and/or one or more behaviors that are undesirable, such that permissible/undesirable behaviors are user configurable. Upon detecting the undesirable behavior, the program 336 can be configured to initiate corrective action via the collar 120.

If the program 336 determines that the animal is resting, the program 336 can transition the collar 120 to resting mode. The program 336 can transition the collar 120 to resting mode only if the animal has a low activity level at a location that is beyond a predetermined distance from a perimeter of a predetermined geo-fenced area. Resting mode can correspond to low power mode in which the collar 120 can be configured to measure and/or transmit data on a less frequent basis as compared to active mode, leash mode, lost mode, or other modes in which data of a higher granularity or higher refresh rate is required or desired.

The program 336 can be configured to determine that the animal is defecating or urinating and can be configured to transition the collar 120 into pet relief mode. For example, the program 336 can be configured to make such a determination based on data from the accelerometer 350 and/or eCompass sensor 395, as described herein. Upon detecting that the animal has defecated or urinated, the program 336 can be configured to transmit a notification to the user device 110 to indicate that the animal has defecated or urinated and/or can store or transmit the location of the defecation or urination such that the user can locate and clean the defecation or urination. The notification can include a map detailing a location for each corresponding defecation or urination. The user device 110 can be configured to track defecations or urinations that have yet to be cleaned. The user device 110 can be configured to receive data indicative of the location of one or more defecations or urinations and can be configured to provide an alarm or an alert if the user device 110 moves to within a predetermined distance of a defecation or urination so as to prevent a user from stepping in the defecation or urination. The user device 110 can be configured to receive input from the user indicating that the user has cleaned one or more particular defecations or urinations such that the corresponding defecations or urinations can be removed from the list of defections or urinations yet to be cleaned that is tracked by the user device 110.

Training mode can include a geolocation setting in which the collar 120 is configured to transmit a constant stream of location data. This can permit highly granular and constantly updated geolocation data, which can be useful in minimizing incorrect geolocation readings that could result in erroneous corrective actions, hindering the training of an animal regarding where a geo-fence boundary is and avoiding or stopping short of that boundary.

Leash mode can correspond to providing a "wireless leash" which can be configured to retain the animal wearing the collar 120 within a predetermined distance with respect to the user device 110 (e.g., a user's mobile phone, a user's smart watch). The length of the leash (i.e., the predetermined distance) can be adjustable by the user, such as via the user device 110 and/or via U/I device 370 of the collar 120. The length of the leash can be adjusted automatically based on proximity to restricted areas or other obstacles (e.g., roads, waterways). The length of the leash can be a predetermined distance or radius from the user device 110 in which the animal is permitted to travel, and as the user device 110 moves (e.g., as indicated by location data provided by the GLS 250 of the user device 110), the center of the area in which the animal is permitted to travel (i.e., the center of a circle from which the predetermined distance or radius extends) can move. The collar can be configured to issue a correction and/or directional command if a current distance between the collar and the user device 110 is greater than the predetermined distance. The collar 120 can be configured to provide directional commands (e.g., turn right or left) based on, for example, the location of the collar 120 and/or eCompass data corresponding to the collar 120 in comparison with the boundaries of the leash length. That is, the collar 120 can be configured to determine whether the collar 120 is near the maximum distance of the leash length and can provide directional commands or other prompts to guide the animal nearer the user device 110. The areas in which the animal is permitted to travel can be manually adjustable by the user via the user device 110.

The collar 120 (or user device 110 or a server) can be configured to determine whether the user and the animal are side-by-side, the user (via location data from the user device 110) is leading the animal (via location data from the collar 120), or the animal is leading the user. In some scenarios, a user may desire the animal to walk side-by-side or behind the user (e.g., for obedience purposes), while in other scenarios (e.g., playing fetch), the user may desire to permit the animal to run ahead of the user. Accordingly, the leash length can be restricted at varying distances depending on the positioning of the collar 120 relative the user device 110. As an example, a user can adjust the wireless leash to permit the animal to walk behind the user up to a distance of 10 feet from the user, to walk side-by-side with the user up to a distance of 5 feet from the user, and to not permit the animal to walk in front of the user (i.e., a leash distance of 0 feet from the user).

The LED 380, a display, or an audio recording on the collar 120 can indicate that the collar 120 is in leash mode. The LED 380, display, or audio recording can be configured to alert passersby that the animal is being restrained by a wireless leash and that the animal is not loose. The user device 110 can be configured to detect spatial gestures performed by the user via accelerometer 260. The user device 110 can be configured to compare detected gesture data indicative of the detected spatial gesture to one or more stored gesture data, each stored gesture data indicative of a corresponding user command. The user device 110 can determine a level of similarity between the detected gesture data and at least one of the stored gesture data, and if the level of similarity between the detected gesture data and particular stored gesture data is above a predetermined threshold, the user device 110 can transmit the corresponding user command to the collar 120. The collar 120 can receive the user command and can issue a corresponding prompt, directional command, and/or corrective action. Thus, detected motion of the user device 110 and a corresponding prompt, directional command, and/or corrective action issued at the collar 120 can mimic a wireless and/or untethered version of a conventional leash. For example, the user can "jerk" or "tug" the user device (e.g., similar to tugging a physical leash) to provide a directional command at the collar 120 commanding the animal to come closer to the user or to face the user of the user device 110.

Leash mode can include functionality such that a plurality of animals, each wearing a collar 120, can be walked simultaneously by a user using one or more user devices 110. The user device 110 (such as by an application or web accessible platform, as discussed more fully below) can be configured such that a first user (e.g., a pet owner) can "lend" or otherwise temporarily (or permanently, if desired) pass control an animal wearing a collar 120 to a second user using a second user device 110. For example, a pet owner can temporarily pass (or share) control of animal wearing a collar 120 to a family member, a dog walker, a groomer, a veterinary office, or some other person or entity. As another example, a pet owner can permanently pass (or share) control of animal wearing a collar 120 to a family member, another person adopting the animal wearing the collar 120, or some other person or entity. The user device 110 passing control or stewardship of the animal wearing the collar 120 can be configured to limit the permissions of the assignee or steward. The user device 110 can be configured to assign, to a user device 110 of the assignee or steward, the same amount of control as the user of the user device 110 (e.g., a user of a first user device 110 can have a spouse using a second user device 110 and the second user device 110 can have the same permissions and capabilities as the user's first user device 110). The user device 110 of the assignee or steward can be enabled to adjust some or all of any configured settings. Conversely, the user device 110 of the assignee or steward can be restricted from adjusting some or all of any configured settings.

The program 336 can be configured to transition the collar 120 to lost mode when the collar 120 is outside a safe area or is in a restricted area. The collar 120 (or a server) can be configured to transmit a notification to the user device 110 indicating that the collar 120 has entered lost mode. Alternatively, the user device 110 can receive data indicative of a location of the collar 120 and can provide an alert upon determining that the collar 120 has entered lost mode (e.g., the collar 120 is outside a safe area or is in a restricted area). Lost mode can include a geolocation setting in which the collar 120 is configured to transmit a constant stream of location data, such that constantly updated geolocation data is available at the user device 110. This can enable a user to more easily find the lost animal.

When in lost mode, the collar 120 can be configured to prompt or provide directional commands to the animal to lead the animal home. The application can be configured to track and/or display a history of routes previously traveled by the animal (e.g., during dog walks). While in lost mode, the program 336 can be configured to select a route home by determining a route that has previously been traveled by the animal. For example, if there is a route home that the animal has previously traveled several times, it is likely that the animal is familiar with the surroundings associated with that route such that the animal is less likely to be confused or distracted. Thus, by following such a route, the collar 120 can be faster and more effective at leading the animal home. The program 336 can be configured to select the route that has been traveled most frequently by the animal, most quickly by the animal, or by some other metric. The collar 120 can be configured to play a pre-recorded audible message indicated the fact that the animal is lost and/or instructions as to how to return the animal to its owner, such as by providing the owner's name and/or contact information.

The disclosed technology can be useful with young children or elderly persons. For example, young children or elderly persons susceptible to confusion can be outfitted with a collar 120 that is configured to, responsive to determining that the collar 120 is leaving a safe area or is approaching a restricted area (e.g., a road), emit a recording instructing the wearer of the collar 120 to return to the safe area.

Various aspects and functionalities of the collar 120 can be selectively controlled, tracked, and viewed via the user device 110, such as by a graphical user interface (GUI) of a mobile phone application or a web accessible platform (e.g., a website). As described herein, the various embodiments of a GUI are referred to collectively as "the application." The application and/or the collar 120 can be configured to automatically provide a geo-fence when an address is input into the application. An automatically provided geo-fence can be adjustable or editable by a user. The collar 120 can be configured to receive input from a user to automatically install a geo-fence upon arrival at a location. For example, a pet owner and a pet can arrive at a new property, the pet owner can provide input indicative of automatically installing a geo-fence at the current location, the collar 120 can determine its current location, and can automatically create a geo-fence following the property lines of the property.

Figure 4A:
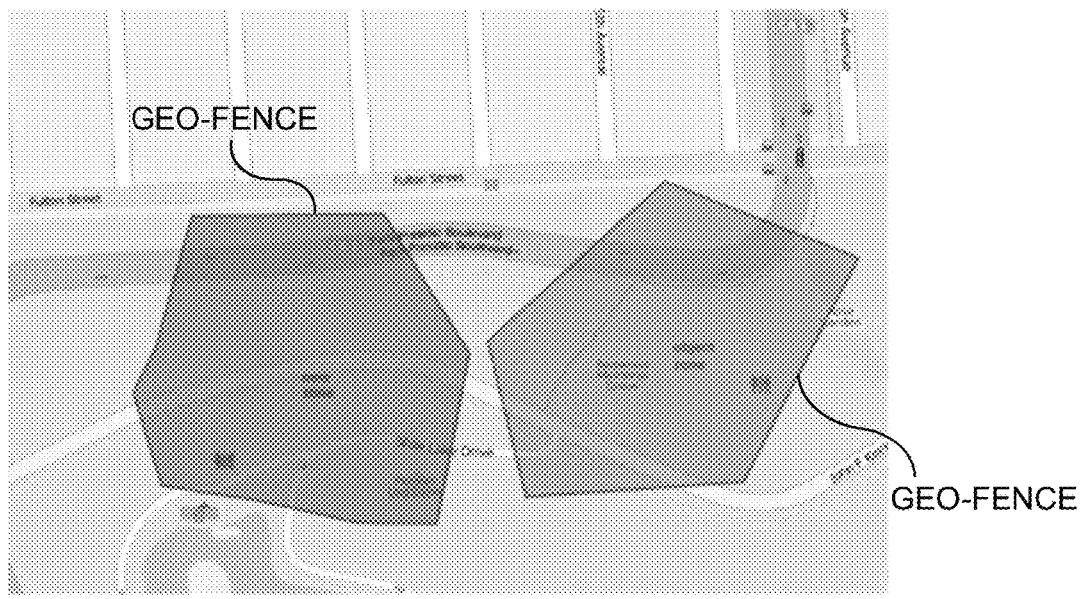
FIG. 4A depicts two geo-fenced areas overlaid a map, according to the present disclosure.
Figure 4B:
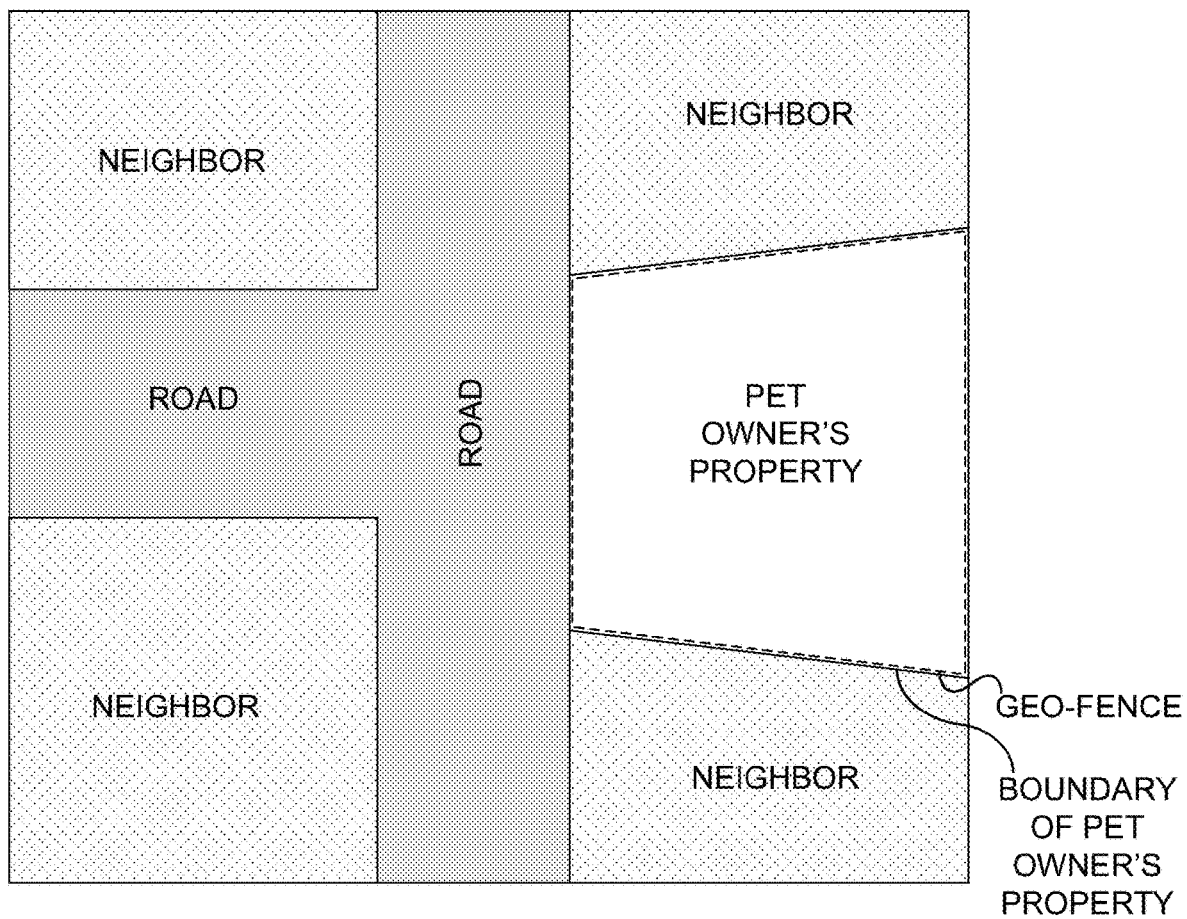
FIG. 4B depicts a geo-fenced area overlaid a map, according to the present disclosure.

The collar 120, the user device 110, and/or the application can be compatible with various mapping technologies, such as Google™ Maps, Apple™ Maps, and Bing™ Maps. The geo-fence and/or the geo-fenced area can be overlaid on a map. A geo-fence can be input into the application by a user drawing the geo-fence on a map within the application, and the user can be enabled to select whether the geo-fenced area is a safe zone or a restricted zone. Example geo-fences overlaid on a map are depicted in FIGS. 4A and 4B. The application can be configured to record a geo-fence as the user device 110 is carried along a perimeter of a desired geo-fenced area. The application can provide for download various pre-created and/or crowdsourced geo-fences, such as a geo-fence corresponding to a dog run in a public park or a hotel or a mapped trail (e.g., a mapped mountain trail). One or more geo-fences can be transferred or otherwise transmitted from the user device 110 to the collar 120. This transfer can be accomplished wirelessly, such as by Bluetooth™ or WiFi™, or via a wired connection, such as by USB. The application can include a window or interface for editing existing geo-fences, such as pre-installed geo-fences, previously created geo-fences, downloaded geo-fences, and/or crowdsourced geo-fences. The application can include a window or interface for deleting existing geo-fences.

The application can include a window or menu in which a user can configure correction rules based on a proximity of the collar 120 to the geo-fence and/or correction rules based on selected portions of the geo-fence. Configuration of correction rules can include the selection of various proximities of the collar 120 to the geo-fence corresponding to various levels of correction. For example, a user can be enabled to select, via the application, the distance from the geo-fence in which a warning correction is produced, the distance from the geo-fence in which a low shock correction is produced, the distance from the geo-fence in which a medium shock correction is produced, and the distance from the geo-fence in which a high shock correction is produced.

The application can provide an interface through which a user can configure correction rules for groups of collars 120 and/or singular collar 120. For example, a user can be enabled to provide a first set of rules for some or all collars 120 corresponding to cows, a second set of rules for some or all collars 120 corresponding to horses, and a third set of rules some or all collars 120 corresponding to all shepherd dogs, and a fourth set of rules for a collar 120 corresponding to a particular coon hound.

The application can include a window or interface for displaying a real-time and/or historical ledger of corrections or a trend analysis (or any other type of analysis) of real-time and/or a historical ledger of corrections. This can be helpful in enabling the user to reinforce and/or correct configured boundaries. The application can include a window or interface for displaying the real-time location and/or position of an animal or a trend analysis (or any other type of analysis) of historical pet location, such as a heat map. The application can include a window or interface for viewing a location of the user device 110 relative to a location of the collar 120, which can be useful when trying to find a lost animal, for example.

The application can include a window or interface for selectively determining which collars 120 are assigned to which animals, which collars 120 are assigned to which geo-fences, at which times certain collars 120 are assigned to certain geo-fences, edit the associations of collars 120 to geo-fences, group collars 120, ungroup collars 120, delete collars, etc.

As will be appreciated, a difficult problem in pet behavior is teaching an animal to stop destructive behaviors when the owner is not present. For example, a dog can chew shoes or furniture while an owner has left his or her house, and upon returning home, the owner can discipline the dog. The dog, however, may be unable to connect the disciplinary actions to the destructive behavior due to the time delay associated with the discipline or other factors. The collar 120 can be configured to provide real-time or near real-time corrective actions to prevent an animal from engaging in destructive behavior. The collar 120 can be configured to communicate with and/or operate in conjunction with a camera system. One or more cameras of the camera system can be configured to record video, and the camera system (or a system associated with the collar 120) can be configured to analyze video to determine whether the animal wearing the collar 120 is chewing, biting, scratching, or otherwise damaging or destroying property or other objects (e.g., shoes, furniture). The collar 120 can be configured to issue corrective actions of varying severity or intensity depending on, for example, the identified property or object being damaged, the persistence or historical proclivity of the animal for engaging in damaging behavior, or manual input from a user. Thus, the collar 120 can be useful for automatically teaching an animal to refrain from engaging in damaging or otherwise undesired behavior.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

What is claimed is:

1. A collar comprising:
a strap configured to be worn by an animal or a person;
a power source;
memory storing instructions;
a processor;
a communication interface configured to transmit and receive data;
an accelerometer in communication with the processor; and
a geolocation sensor in communication with the processor,
wherein the collar is configured to operate in a plurality of operating modes, each operating mode of the plurality of operating modes including a set of operational rules for at least one component of the collar, the plurality of operating modes comprising at least one of an indoor mode, a low power mode, a training mode, an active mode, a rest mode, a leash mode, a pet relief mode, and a lost mode.

2. The collar of claim 1, wherein the collar is configured to receive at least one of (i) first geo-fence data indicative of a first predetermined geographical area in which it is permissible for the collar to be located and (ii) second geo-fence data indicative of a second predetermined geographical area in which it is impermissible for the collar to be located.

3. The collar of claim 2, wherein the collar is configured to output a first corrective action responsive to determining that the collar is located inside the first predetermined geographical area and within a predetermined distance from a boundary of the first predetermined geographical area.

4. The collar of claim 3, wherein the first corrective action is at least one of an emission of light, a vibration, output of an audible warning via a speaker of the collar, and output of a pre-recorded voice command via the speaker.

5. The collar of claim 3, wherein the collar is configured to output the first corrective action responsive to determining that:
the collar is located (i) inside the first predetermined geographical area and (ii) within a predetermined distance from a boundary of the first predetermined geographical area, and
the animal wearing the collar is moving toward the boundary of the first predetermined geographical area.

6. The collar of claim 2, wherein the collar is configured to output a second corrective action responsive to determining that the collar is located outside the first predetermined geographical area or the collar is located inside the second predetermined geographical area.

7. The collar of claim 6, wherein the second corrective action is at least one of providing an electrical shock, spraying a liquid, and outputting a pre-recorded voice command via a speaker of the collar.

8. The collar of claim 2 further comprising a magnetometer configured to determine a direction in which an animal wearing the collar is facing,
wherein the collar is further configured to:
determine that the collar is outside the first predetermined geographical area;
determine a current location and a current orientation of the collar, the current orientation corresponding to a direction in which the collar is facing and based at least in part on data received from the magnetometer;
determine a return path to the first predetermined geographical area; and
instruct, via one or more corrective actions, the animal wearing the collar to orient itself in a direction to follow the return path.

9. The collar of claim 8, wherein the collar is further configured to:
responsive to determining that the current location of the collar has deviated from the return path, instruct, via one or more corrective actions, the animal wearing the collar to orient itself in a direction to follow the return path and to move in a direction to follow the return path.

10. The collar of claim 1, wherein the collar is configured to output a user-defined corrective action according to instructions received from a user device.

11. The collar of claim 1 further comprising a magnetometer configured to determine a direction in which an animal wearing the collar is facing.

12. The collar of claim 1, wherein the collar is configured to determine a current operating mode of the plurality of operating modes based on data received from at least one of the accelerometer, the geolocation sensor, a camera integrated into the collar, a remotely located camera, a temperature gauge integrated into the collar, a magnetometer integrated into the collar, a biometric sensor integrated into the collar, or one or more short-range wireless beacons.

13. The collar of claim 12, wherein the collar is configured to distinguish between the indoor mode and an outdoor mode based on at least one of:
determining a proximity of the collar to the one or more short-range wireless beacons;
determining a current location of the collar and comparing the current location of the collar to a known location of an indoor area; and
comparing a current temperature of the collar to a local outdoor temperature, the current temperature of the collar determined by the temperature gauge of the collar and the local outdoor temperature received from an outdoor temperature data source.

14. The collar of claim 1, wherein the plurality of operating modes further comprises an outdoor mode.

15. The collar of claim 1, wherein the plurality of operating modes comprises at least two of the indoor mode, the low power mode, the training mode, the active mode, the rest mode, the leash mode, the pet relief mode, and the lost mode.

16. The collar of claim 1, wherein the plurality of operating modes comprises at least three of the indoor mode, the low power mode, the training mode, the active mode, the rest mode, the leash mode, the pet relief mode, and the lost mode.

17. A collar comprising:
a strap configured to be worn by an animal or a person;
a power source;
memory storing instructions;
a processor;
a communication interface configured to transmit and receive data;
an accelerometer in communication with the processor; and
a geolocation sensor in communication with the processor,
wherein the collar is configured to:
receive at least one of (i) first geo-fence data indicative of a first predetermined geographical area in which it is permissible for the collar to be located and (ii) second geo-fence data indicative of a second predetermined geographical area in which it is impermissible for the collar to be located;

determine an accuracy of current geolocational data corresponding to a current location of the collar; and responsive to determining the accuracy is below a predetermined threshold, restrict output of any corrective actions.

18. A collar comprising:

a strap configured to be worn by an animal or a person;
a power source;
memory storing instructions;
a processor;
a communication interface configured to transmit and receive data;
an accelerometer in communication with the processor;
a geolocation sensor in communication with the processor; and
a magnetometer configured to determine a direction in which an animal wearing the collar is facing,
wherein the collar is configured to:
    receive at least one of (i) first geo-fence data indicative of a first predetermined geographical area in which it is permissible for the collar to be located and (ii) second geo-fence data indicative of a predetermined geographical area in which it is impermissible for the collar to be located, and output a corrective action responsive to determining that:
        the collar is located (i) inside the first predetermined geographical area and (ii) within a predetermined distance from a boundary of the first predetermined geographical area, and
        the animal wearing the collar is facing the boundary of the first predetermined geographical area.

19. A collar comprising:

a strap configured to be worn by an animal or a person;
a power source;
memory storing instructions;
a processor;
a communication interface configured to transmit and receive data;
an accelerometer in communication with the processor; and
a geolocation sensor in communication with the processor,
wherein the collar is configured to issue corrective actions from a first plurality of corrective actions when the collar is located outdoors and corrective actions from a second plurality of corrective actions when the collar is located indoors.

* * * * *